US008534624B2

United States Patent
Lunitz et al.

(10) Patent No.: US 8,534,624 B2
(45) Date of Patent: Sep. 17, 2013

(54) DEVICE FOR SUPPORTING SYSTEMS

(75) Inventors: Barbara Lunitz, Hamburg (DE); Hans Peter Guthke, Buxtehude (DE); Marcus Juenemann, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 1390 days.

(21) Appl. No.: 12/130,382

(22) Filed: May 30, 2008

(65) Prior Publication Data

US 2008/0296443 A1    Dec. 4, 2008

Related U.S. Application Data

(60) Provisional application No. 60/941,399, filed on Jun. 1, 2007.

(30) Foreign Application Priority Data

Jun. 1, 2007  (DE) .......................... 10 2007 025 746
Dec. 13, 2007  (DE) .......................... 10 2007 060 030

(51) Int. Cl.
*A47B 96/00*    (2006.01)
(52) U.S. Cl.
USPC ............ 248/223.41; 248/220.21; 248/220.22; 211/85.29; 211/70.6
(58) Field of Classification Search
USPC ................. 248/49, 68.1, 62, 63, 73, 74.1, 53, 248/220.21, 220.22, 911, 912, 201, 58, 221.11, 248/222.51, 222.52, 223.31, 223.41, 225.21; 211/118, 106.01, 85.29, 70.6
See application file for complete search history.

(56) References Cited

U.S. PATENT DOCUMENTS

| | | | | |
|---|---|---|---|---|
| 3,125,196 A | * | 3/1964 | Fenner | 52/656.7 |
| 3,188,030 A | * | 6/1965 | Fischer | 248/68.1 |
| 3,523,667 A | * | 8/1970 | Guerrero | 248/49 |
| 3,526,934 A | * | 9/1970 | Owen, Sr. | 285/154.1 |
| 3,765,629 A | * | 10/1973 | Voelker et al. | 248/74.4 |
| 3,856,246 A | * | 12/1974 | Sinko | 248/68.1 |
| 3,916,089 A | * | 10/1975 | Sloan | 174/164 |
| 4,093,076 A | * | 6/1978 | Newton | 211/74 |

(Continued)

FOREIGN PATENT DOCUMENTS

| | | |
|---|---|---|
| DE | 7416335 | 1/1975 |
| DE | 19545867 | 8/1996 |

(Continued)

OTHER PUBLICATIONS

Office Action DE—10 2007 025 746.7-24 dated Dec. 5, 2007.

*Primary Examiner* — Kimberly Wood
(74) *Attorney, Agent, or Firm* — Occhiuti Rohlicek & Tsao LLP

(57) ABSTRACT

The present invention relates to a device for supporting systems, for example an electric cable or a fluid-carrying pipe, on a structure of an aircraft or space craft, and to an aircraft or space craft with such a device. The device has a basic bracket arrangement which can be fastened to at least one predetermined fastening section of the structure, and also has at least one system bracket for supporting the systems. The at least one system bracket can be fastened to the basic bracket arrangement locationally variable with respect to the fastening section. The advantage of the invention consists in the fact that a route of a system can be flexibly varied even during the equipment assembly, i.e. the structure is no longer modifiable or is only modifiable at considerable expense.

8 Claims, 23 Drawing Sheets

(56) References Cited

U.S. PATENT DOCUMENTS

| | | | |
|---|---|---|---|
| 4,336,673 A * | 6/1982 | Duchesne et al. | 52/27 |
| 4,410,095 A * | 10/1983 | Dembicks | 211/70.6 |
| 4,526,333 A * | 7/1985 | Nakama et al. | 248/73 |
| 4,601,447 A * | 7/1986 | McFarland | 248/49 |
| 4,618,114 A * | 10/1986 | McFarland | 248/65 |
| 4,856,658 A * | 8/1989 | Novak | 211/26.1 |
| 5,104,072 A * | 4/1992 | Kuo et al. | 248/68.1 |
| 5,642,612 A | 7/1997 | Hughes | 59/78.1 |
| 5,791,607 A * | 8/1998 | Thibault et al. | 248/58 |
| 5,823,484 A * | 10/1998 | Barnard et al. | 248/72 |
| 5,829,243 A * | 11/1998 | Hughes | 59/78.1 |
| 5,855,279 A * | 1/1999 | Klein et al. | 211/35 |
| 6,375,129 B2 * | 4/2002 | Koziol | 248/68.1 |
| 6,378,811 B1 * | 4/2002 | Potter et al. | 248/68.1 |
| 6,513,781 B1 * | 2/2003 | Meyer et al. | 248/544 |
| 6,677,526 B2 * | 1/2004 | Kishizawa | 174/68.1 |
| 6,880,787 B2 * | 4/2005 | Stephen et al. | 248/68.1 |
| 6,889,944 B2 * | 5/2005 | Brandzel et al. | 248/68.1 |
| 7,467,767 B2 * | 12/2008 | Miles et al. | 248/74.1 |
| 7,481,644 B2 * | 1/2009 | Chen | 425/192 R |
| 7,497,718 B2 * | 3/2009 | Nix et al. | 439/347 |
| 7,520,476 B2 * | 4/2009 | Caveney et al. | 248/72 |
| 7,635,108 B2 * | 12/2009 | Zeuner et al. | 248/65 |
| 7,686,259 B2 * | 3/2010 | Caveney et al. | 248/68.1 |
| 7,802,680 B2 * | 9/2010 | Krebs et al. | 206/349 |
| 7,828,251 B2 * | 11/2010 | Tollefson | 248/68.1 |
| 8,074,945 B2 * | 12/2011 | Schoenau et al. | 248/74.4 |
| 8,079,552 B2 * | 12/2011 | Sweigard | 248/74.2 |
| 2004/0113024 A1 * | 6/2004 | Caveney et al. | 248/72 |
| 2005/0211463 A1 * | 9/2005 | Zeuner et al. | 174/138 G |

FOREIGN PATENT DOCUMENTS

| | | |
|---|---|---|
| DE | 2004009557 | 8/2004 |
| EP | 0466373 | 1/1992 |
| GB | 2049019 | 12/1980 |

* cited by examiner (A)

(B)

(C)

(D)

(F-F)

(E)

(H)

(G)

(J)

DEVICE FOR SUPPORTING SYSTEMS

FIELD OF INVENTION

The present invention relates to a device for supporting systems, for example an electrical cable or a fluid-carrying pipe, on a structure of an aircraft or space craft, and to an aircraft or space craft with such a device.

Although applicable to any systems and aircraft or space craft, this invention and the problem on which it is based are explained with reference to an electrical cable in a passenger aircraft. The contents of U.S. Provisional Application No. 60/941,399 is herein included by cross-reference.

BACKGROUND OF THE INVENTION

In a modern passenger aircraft a multiplicity of electrical components has to be connected to each other by means of electrical cables. If a distance between two electrical components to be connected exceeds a certain value, it is necessary, in particular for safety reasons and for reasons of order, to support the electrical cable provided for connecting the electrical components along its route between the electrical components. The support is in this case provided on a structure, a cross member, for example, of the passenger aircraft by means of a device.

Such a device known to the applicant for supporting the electrical cable described has a metal approximately Z-shaped A-bracket which is already riveted to the shell of the structure, as well as a B-bracket and a C-bracket, both of which are installed during the assembly of equipment in the passenger aircraft. The B-bracket is connected at its one end to the A-bracket and at its other end to the C-bracket which supports the electrical cable.

In the device of prior art it turned out to be disadvantageous that a change in the route of the electrical cable to be laid is hardly possible during the equipment assembly because the A-bracket is firmly riveted to the structure.

SUMMARY OF THE INVENTION

A device for supporting systems, for example an electrical cable or fluid-carrying pipe, is provided on a structure of an aircraft. The device has a basic bracket arrangement which can be fastened to at least one predetermined fastening section of the structure and at least one system bracket for supporting the systems. The system bracket can be fastened to the basic bracket device so that it has variable locations relative to the fastening section.

Furthermore, an aircraft with a structure which has a predetermined fastening section is provided, the device according to the invention being fastened to the predetermined fastening section.

The idea on which this invention is based consists in the fact that a distance between the fastening section and the system bracket is variable.

The system bracket can therefore be arranged during the equipment assembly so that an optimum route is obtained for the systems to be supported.

Furthermore, the fastening section, for example a bore, can be provided at almost any point of the structure in such a manner, in particular, so that the stability of the structure is not impaired or is only slightly impaired.

Advantageous embodiments and improvements of the invention are described in the dependent claims.

"Variable locations" in this patent application refers to a variability of the distance between the fastening section and the at least one system bracket.

According to a preferred embodiment of the device it is of modular design. "Modular" means that the device is designed according to the modular principal, i.e. the device has at least a first and a second component which can be combined differently in order to form the device. Thereby the second component can preferably be replaced by a third component. The first, second and/or third component preferably have similarly designed connection points, so that the first, second and/or third component can be connected to each other, in particular in a releasable manner, in any sequence. In the device according to the invention the first and second component, for example, can be designed as two round chain link brackets or as a basic traverse bracket and a traverse, and the third component as the system bracket.

The advantages of a device of such a modular design are that the same components can be manufactured more cost efficiently and that the device can be designed differently with the same components, for example by varying the sequence of the components connected to each other—for example first-second-third component can be easily converted to first-third-second component—, which ultimately means that fewer components of different types are required and the production costs of the device can be reduced.

According to a further preferred embodiment of the device according to the invention the basic bracket arrangement has several basic chain link brackets which are releasably interlinked with each other, wherein the at least one system bracket can be fastened to one of the plurality of basic chain link brackets. Here the plurality of basic chain link brackets themselves preferably creates the modular system described above, i.e. at least two or three of the plurality of basic chain link brackets correspond to the first and second or first, second and third component.

Designing the basic chain link bracket according to the modular principle causes that a chain formed from them can be shortened or extended to any degree. By inserting/adding basic chain link brackets in/to a chain section or removing them from a chain section, which has at its one end the basic chain link bracket to which the system bracket is fastened, and which is fixed at its other end to the fastening section of the structure, the distance between the system bracket and the fastening section may be varied.

Obviously the chain may also be extended or shortened first and the system bracket may subsequently be fastened to one of the chain links.

In a further preferred embodiment of the device according to the invention the at least one system bracket can be fastened to at least two basic chain link brackets. This provides a further possibility of varying the distance between the system bracket and the fastening section, i.e. in addition or alternatively to an extension or shortening of the chain formed.

In a further preferred embodiment of the device according to the invention at least two of the plurality of basic chain link brackets are interlinked to each other in an articulated and/or elastic manner. The basic bracket arrangement can therefore also follow almost arbitrarily curved structures, which results in an even more flexible applicability of the device.

According to a further preferred embodiment of the device according to the invention at least one of the plurality of basic chain link brackets has an engaging element or a receiving element, wherein the engaging element is designed for a particularly positive engagement in a receiving element of another of the plurality of basic chain link brackets, and the receiving element of the at least one of the plurality of basic chain link brackets is designed for a particularly positive support of an engaging element of yet another of the plurality of basic chain link brackets. Such a particularly positive interlinking of the basic chain link brackets is simple to achieve. Any plug-in connectors may be considered as engaging and receiving elements.

The engaging element is preferably designed as a pin and the receiving element as a bushing, the pin being rotatably mounted in the bushing. This provides, by simple means, an articulated interlinking of the basic chain link bracket, which provides the advantages already described above.

Pursuant to a further preferred embodiment of the device according to the invention the engaging element is designed as a finger on a basic body of the at least one of the plurality of basic chain link brackets with two recesses arranged displaced relative to each other on the longitudinal side and on opposite sides of the finger, and the receiving element is designed as two bridges bridging a slot in a basic body of the other of the plurality of basic chain link brackets, and displaced relative to each other in the direction of the form closure to be produced between the engaging element and the receiving element, the recess of the finger engaging with the bridges after insertion of the finger at an angle between the bridges and subsequent alignment of the finger along the slot. This provides the advantage that bending moments can be transmitted from one basic chain link bracket into the basic chain link bracket interlinked with it According to a further preferred embodiment of the device according to the basic bracket arrangement has at least one basic traverse bracket and a traverse fastened to the basic traverse bracket, wherein the at least one system bracket can be fastened to the traverse at one of a plurality of fastening points, particularly bores or recesses. This embodiment also allows for a locally variable fastening of the at least one system bracket relative to the predetermined fastening section of the basic bracket arrangement. Here the plurality of fastening points can be provided at any distances on the traverse. Moreover, it is possible to design the basic bracket arrangement with a plurality of basic chain link brackets, basic traverse brackets and traverses fastened to the basic traverse brackets. Here one of the basic chain link brackets could be coupled to one of the basic traverse brackets, and in particular interlinked with it. Alternatively or additionally one of the basic chain link brackets could also function both as a basic chain link bracket and a basic traverse bracket. The basic traverse brackets and the traverse are preferably arranged relative to each other and fastened to each other, in particular in a releasable manner, so that the traverse forms a self-supporting bridge between the basic traverse brackets. Here the fastening points are arranged in the self-supporting region of the bridge. A further advantage of this embodiment may consist in the fact that other systems, for example pipes, may be passed through in the spanned region between the structure and the traverse.

In a further preferred embodiment of the device according to the invention at least one of the plurality of basic chain link brackets and/or of the basic traverse brackets has fastening means for fastening to the at least one predetermined fastening section of the structure. Preferably, one of the plurality of the basic chain link brackets or the basic traverse bracket has the fastening means. Because of the stringent stability requirements in aircrafts and spacecrafts in particular, measures altering the structure of the aircraft or space craft for providing the predetermined fastening section, for example the drilling of a bore forming the predetermined fastening section, can only be carried out in predetermined regions of the structure. These predetermined regions are in many cases not located in the immediate vicinity of the systems to be supported. It is therefore advantageous for the basic bracket arrangement only to be fastened to a few, preferably only one of its plurality of basic chain link brackets and/or basic traverse brackets on the predetermined fastening section of the structure, and for the other of the plurality of basic chain link brackets or basic traverse brackets to connect the region between the at least one system bracket and the predetermined fastening section, in particular in such a manner that forces resulting from the supporting of the systems can be introduced by the at least one system bracket by means of the plurality of basic chain link brackets or basic traverse brackets into the predetermined fastening section of the structure.

In a further preferred embodiment of the device according to the invention the fastening means are designed as a pin and/or a screw and the at least one predetermined fastening section is designed as a bore or threaded bore in the structure, wherein the fastening means can be brought to engagement with the at least one fastening section. This represents a very simple possibility of achieving a fixing of a basic chain link bracket or of a basic traverse bracket.

In a further preferred embodiment of the device according to the invention at least one of the basic chain link brackets and/or the basic traverse bracket can be brought to engagement with a profile of the structure extending in the longitudinal direction. This guarantees simple assembly of the device on the structure.

In a further preferred embodiment of the device according to the invention at least one of the basic chain link brackets and/or basic traverse brackets has at least one supporting engaging behind section for engaging behind a section of the structure, particularly of the profile in which a force flow resulting from the supporting of the systems can be received. The engaging behind section preferably engages behind the structure in a direction opposed to the force of gravity (when the device according to the invention is mounted on the structure) and/or in the transverse direction of the profile. The device according to the invention is typically mounted underneath the structure, wherein the force of gravity acts downwards. A support of at least one of the basic chain link brackets or basic traverse brackets opposing the force of gravity is required, particularly because of the considerable forces which result from the supporting of the systems and particularly from the force of gravity acting on the systems. This can be implemented in a staple manner by means of the at least one engaging behind section.

In a further preferred embodiment of the device according to the invention the at least one supporting engaging behind section of the at least one basic chain link bracket and/or basic traverse bracket is designed for engaging behind a section of the lower chord of the structure. "Lower chord" refers, for example, to the foot of a T-profile or the feet of an I-profile. It is comparatively simple to design the supporting engaging behind section in the shape of a hook, for example, so that it is suitable for at least partial engaging behind of the lower chord.

According to a further preferred embodiment of the device according to the invention at least two of the plurality of basic chain link brackets and/or basic traverse brackets each have one of the supporting engaging behind sections, the supporting engaging behind sections being arranged so that they are opposed in an offset manner, for engaging behind the section of the structure at opposite and offset ends. Material can be saved by means of this embodiment and the production expenditure of the basic chain link brackets or basic traverse brackets can be reduced because they only have one engaging behind section but nevertheless an almost symmetrical force introduction into the structure can be achieved.

Just as well the engaging behind sections can be provided to be arranged next to each other in an offset manner for engaging behind the structure on sections lying next to each other in an offset manner on two basic chain link brackets or basic traverse brackets that are, in particular, interlinked with each other.

According to a further embodiment of the device according to the invention the at least two of the plurality of basic chain link brackets and/or basic traverse brackets have, each directly opposite to the supporting engaging behind sections, a non-supporting snap hook for engaging behind the structure on the respective sections of the structure that lie opposite to the sections which are assigned to the engaging behind elements. This embodiment also serves to reduce the material and assembly expenditure of the basic chain link brackets or basic traverse brackets. The non-supporting snap hooks can be designed weakly compared to the supporting engaging behind sections because it does not serve to receive the force of gravity but only to prevent the supporting engaging behind section from sliding out of engagement with the structure.

According to a further preferred embodiment of the device according to the invention at least two of the plurality of basic chain link brackets and/or basic traverse brackets each have the fastening means, at a certain distance from the engaging behind sections, for example a bore or recess and/or a pin or screw, for fastening to the at least one predetermined fastening section of the structure. The advantage of this is that the engaging behind sections are prevented from sliding out of their engagement of the section of the structure and/or that a more uniform force introduction by the respective basic chain link bracket or basic traverse bracket into the structure is facilitated.

In a further preferred embodiment of the device according to the invention at least one of the plurality of basic chain link brackets and/or basic traverse brackets has two parts that are guided linearly into each other and towards each other and that are interlockable to each other, in particular by means of a snap hook, these each being provided with engaging behind sections of the structure arranged opposite to each other, in which sections a force flow resulting from the supporting of the systems can be received. Such a two-part basic chain link bracket or basic traverse bracket is very simple to assemble.

In a further preferred embodiment of the device according to the invention the at least one system bracket can be fastened releasably to the at least one basic chain link bracket, in particular by suspending in a recess in the at least one basic chain link bracket and/or to the fastening points of the traverse. This allows for a very simple assembly of the system bracket and/or for a replacement of the same with a further system bracket. Furthermore, where a plurality of basic chain link brackets are designed for fastening a system bracket, the same system bracket can be fastened to one of the basic chain link brackets, as required, so that the distance between the system bracket and the predetermined fastening section is variable. Moreover, the system bracket can be fastened to any fastening points of the traverse and can be released from them again, for example in order to adapt to modified requirements regarding the route of the systems to be laid. The fastening points of the traverse may also be designed as recesses, for example.

According to a further preferred embodiment of the device according to the invention at least two of the plurality of basic chain link brackets and/or basic traverse brackets are of identical design. A higher number of identical parts advantageously reduces the production costs and also reduces the cost of preparation expenditure for the assembly of the device according to the invention. "Identical" may also only relate to the respective engaging elements and receiving elements for interlinking the basic chain link brackets.

In a further embodiment of the device according to the invention at least two of the plurality of basic chain link brackets and/or basic traverse brackets are designed so that they are mirror symmetrical to each other. This may, for example, favour a more uniform introduction of forces from the basic chain link brackets into the structure. Where the engaging and receiving elements or the basic chain link brackets are suitably designed, this may also be a precondition for their interlinkability.

According to a further preferred embodiment of the device according to the invention at least one of the plurality of basic chain link brackets, at least one of the basic traverse brackets, the traverse and/or the at least one system bracket are formed from a thermally and/or electrically insulating material, in particular from a plastic material. Since the structure is typically designed as a support connected to the aircraft skin, and is therefore very cold, it is advantageous to form at least the components of the device according to the invention, i.e. one of the basic chain link brackets, for example, from a thermally insulating material in order to prevent or greatly reduce precipitation of condensation on the device according to the invention. This would otherwise disadvantageously result in an uncontrolled accumulation of condensation. An electrically insulating material may reduce the risk of fire.

According to a further preferred embodiment of the invention a plurality of system brackets may be fastened to the basic bracket arrangement only at predetermined distances from each other. These distances, also called segregation distances, are required in passenger aircraft particularly for safety reasons. This may be achieved, for example, by providing the fastening points for the system brackets on the traverse at a predetermined distance from each other on the traverse. Just as well this can be achieved by means of the basic chain link brackets. For this purpose these brackets can each be provided with a support for fastening one of the plurality of system brackets so that the basic chain link brackets, when interlinked with each other, position the plurality of system brackets at predetermined distances from each other.

According to a further preferred embodiment of the invention a plurality of system brackets can be releasably fastened to at least one of the plurality of basic chain link brackets. If a plurality of systems is to be run in close vicinity to each other, it may be favourable to provide one basic chain link bracket with a plurality of supports for system brackets instead of a plurality of individual basic chain link brackets each with a support for a system bracket. This eliminates the assembly expenditure incurred in interlinking the plurality of individual basic chain link brackets.

According to a preferred embodiment of the invention the at least one of the plurality of basic chain link brackets has at least one supporting engaging behind section and a plurality of receiving sections for the releasable fastening of supporting elements on these, wherein the supporting elements each have a supporting engaging behind section, wherein the at least one engaging behind section of the at least one basic chain link bracket and the engaging behind sections of the supporting elements fastened in the receiving sections lie opposite to each other and are designed for engaging behind opposing sections of the structure. According to the weight of the supported systems, more or fewer supporting elements can be used. Because of this flexibility the aircraft weight can be reduced. In this case the supporting elements are preferably designed as clips which can be clipped into the receiving sections designed as clip-in sections. In this case "can be clipped into" refers to fastening by means of spreading upward or inward in a spring fashion.

According to a further preferred embodiment of the invention the supporting elements have engaging means for securing the at least one system bracket in its position. The system bracket is preferably suspended in the basic chain link bracket or the like; positive closure is therefore generated in the direction of the force of gravity. However, at this it is also necessary to prevent a mobility of the system bracket relative to the basic chain link bracket perpendicular to the direction of the force of gravity, because otherwise the system bracket could leave its position in which it forms a positive closure with the basic chain link bracket. The engaging means of the supporting elements are providing this. Consequently the supporting elements preferably have a dual function in this case: retaining the basic chain link bracket on the structure and securing the system bracket. The number of components can thereby be reduced.

According to a preferred embodiment of the aircraft or spacecraft according to the invention the structure is designed as a support, stringer and/or rib. Such structures allow for a very simple support of systems, particularly at a certain distance from the aircraft skin.

In a further preferred embodiment of the inventive aircraft or space craft the structure has a profile, in particular a T-profile or double-T-profile. An assembly that can be displaced in the longitudinal direction of the profiles, particularly on the lower chord of the same, is simple to achieve in terms of design.

BRIEF DESCRIPTION OF THE DRAWINGS

The invention is explained in greater detail in the following by means of exemplary embodiments with reference to the attached figures.

In the Figures.

DETAILED DESCRIPTION OF THE INVENTION

Figure 1:
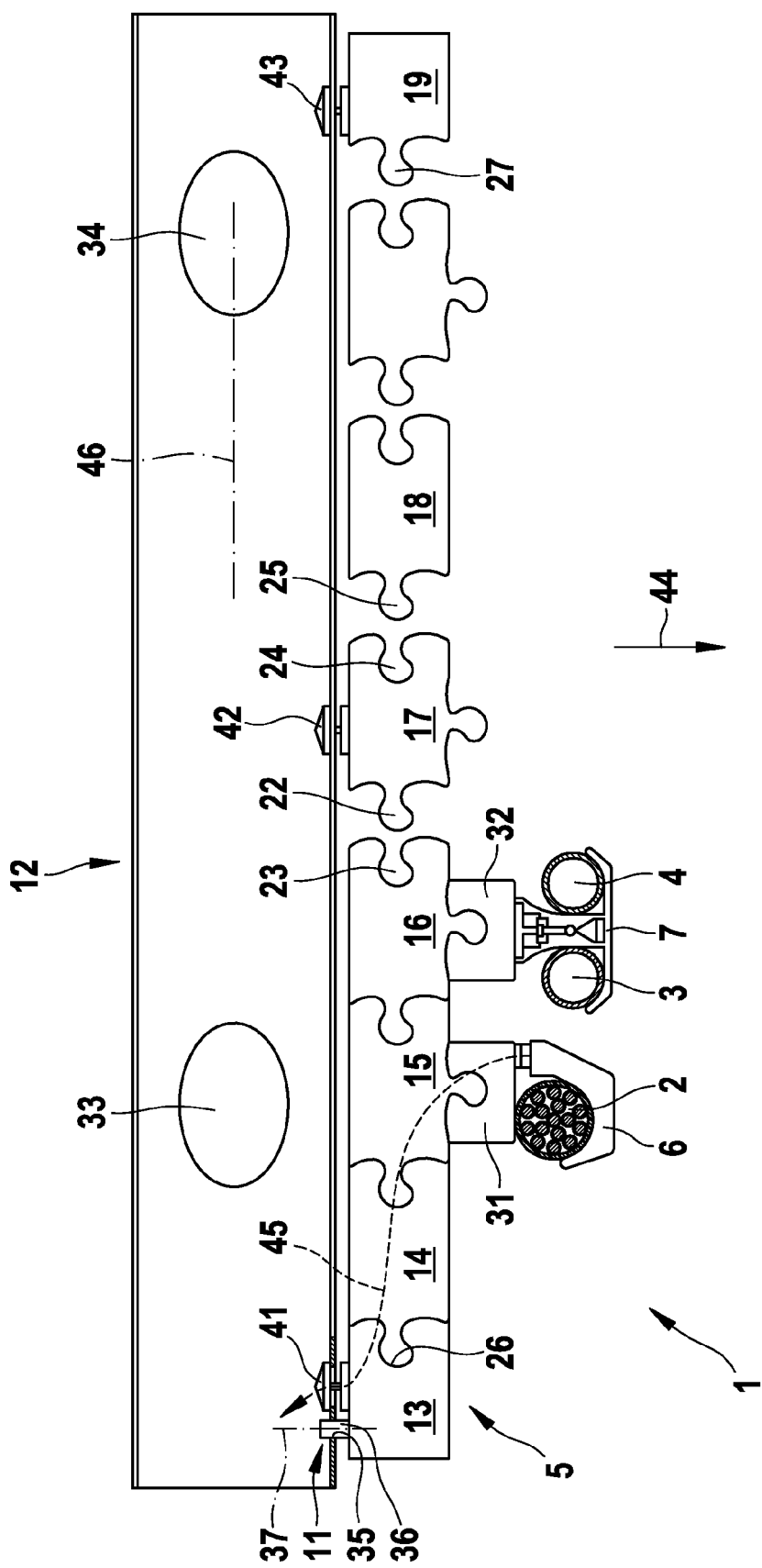
FIG. 1 shows in a diagrammatic view a section of an aircraft or space craft according to one embodiment of the invention.

In the figures the same reference numbers denote the same or functionally similar components, unless otherwise indicated FIG. 1 shows, in a front view, a section of an aircraft or space craft according to an embodiment of the present invention.

A device 1 has a basic bracket arrangement 5 and system brackets 6, 7 fastened to it for supporting systems 2, 3, 4.

The systems 2, 3, 4 are each designed, for example, as electric cable looms, air-conditioning pipes, water and/or oxygen pipes.

The basic bracket arrangement 5 is fixedly connected to a structure 12 designed as a double-T-profile, for example a cross member of an aircraft.

Device 5 is composed of several basic chain link brackets (denoted, by way of example, by the reference numbers 13, 14, 15, 16, 17, 18, 19). Basic chain link brackets 13 . . . 19 are interlinked in the nature of a puzzle.

The basic chain link brackets 14 . . . 17 each have an engaging element (denoted by way of example with reference number 22 for basic chain link bracket 17) for engaging in an adjacent receiving element 23 (indicated by way of example on basic chain link bracket 16) and a receiving element 24 for the engagement of an engaging element (denoted by way of example with reference number 25 for basic chain link bracket 18) of basic chain link support 18 arranged adjacently. Engaging element 22 and receiving element 24 of each basic chain link bracket 14 . . . 18 are preferably arranged at opposite ends of the same.

The basic chain link brackets 13 or 19 are each arranged at the end of the chain formed by basic chain link brackets 13 . . . 19, and therefore preferably only have one receiving element 24 and one engaging element 27.

The system brackets 6, 7 are each preferably releasably fastened by means of interfaces 31, 32 to basic chain link brackets 31 and 32, respectively. The interfaces 31, 32 are in this case suitably distant from each other to maintain predetermined segregation distances.

The system bracket 6 supports, for example, a system 2 designed as a cable loom, shown in section, whilst system bracket 7 supports two systems 3, 4 designed as pipes, shown in section. The system brackets 6, 7 are designed in the shape of a hook or a double hook.

The structure 12 has, for example, weight-saving recesses 33, 34. This is because a variation in structure 12 is only allowed in predetermined regions, unless excessive weakening of the stability of structure 12 shall be accepted. In this exemplary embodiment the position of the predetermined fastening section 11 of structure 12 therefore corresponds to that of the predetermined region. The predetermined fastening section 11 has a bore 35 which is drilled into structure 12. A pin 36, which engages in a recess, not shown, in basic chain link bracket 13, is pushed through bore 35. Pin 36 prevents a movement of basic bracket arrangement 5 transversely to the longitudinal axis 37 of pin 36 when interacting with bore 35 and the recess. Consequently a movement of basic bracket arrangement 5 in longitudinal direction 46 of structure 12 is prevented.

Furthermore, a multiple basic chain link brackets 13, 17, 19 are provided with supporting means 41, 42, 43 which support the basic bracket arrangement 5 against force of gravity 44 (shown as a vector) on structure 12. Consequently a force flow 45, resulting in particular from the weight of the systems, can be introduced into structure 12 by means of supporting means 41, 42, 43. Supporting means 41, 42, 343 are preferably designed so that they allow displacement of basic chain link brackets 13, 17, 19 in longitudinal direction 46 of structure 12. Only the interaction of pin 36 with brackets 41, 42, 43 fixes basic bracket arrangement 5 in all three degrees of freedom. A modification of structure 12 in the region of supporting means 41, 42, 43 is advantageously not necessary.

The device 1 preferably has a modular design. In this embodiment this means that the basic chain link brackets j14 . . . 19 can be removed, replaced or even changed in sequence in an arbitrary manner. This results from the releasable engaging and receiving elements 22, 25, 27 and 23, 24, 26 respectively, which are of homogeneous design. Furthermore, a plurality of basic chain link brackets 13 . . . 19 are of identical design, for example basic chain link brackets 15, 16 or also 14, 18. Moreover, system brackets 6, 7 can be fastened to a plurality of basic chain link brackets 13 . . . 19, for example to basic chain link brackets 15, 16, 17, 18. System brackets 6, 7 also each have identical interfaces 31, 32 with basic chain link brackets 15, 16. This means that any system brackets 6, 7, and hence also any systems 2, 3, 4, can be fitted, in particular releasably, to a basic chain link bracket 15, 16, 17, 18.

Figure 2:
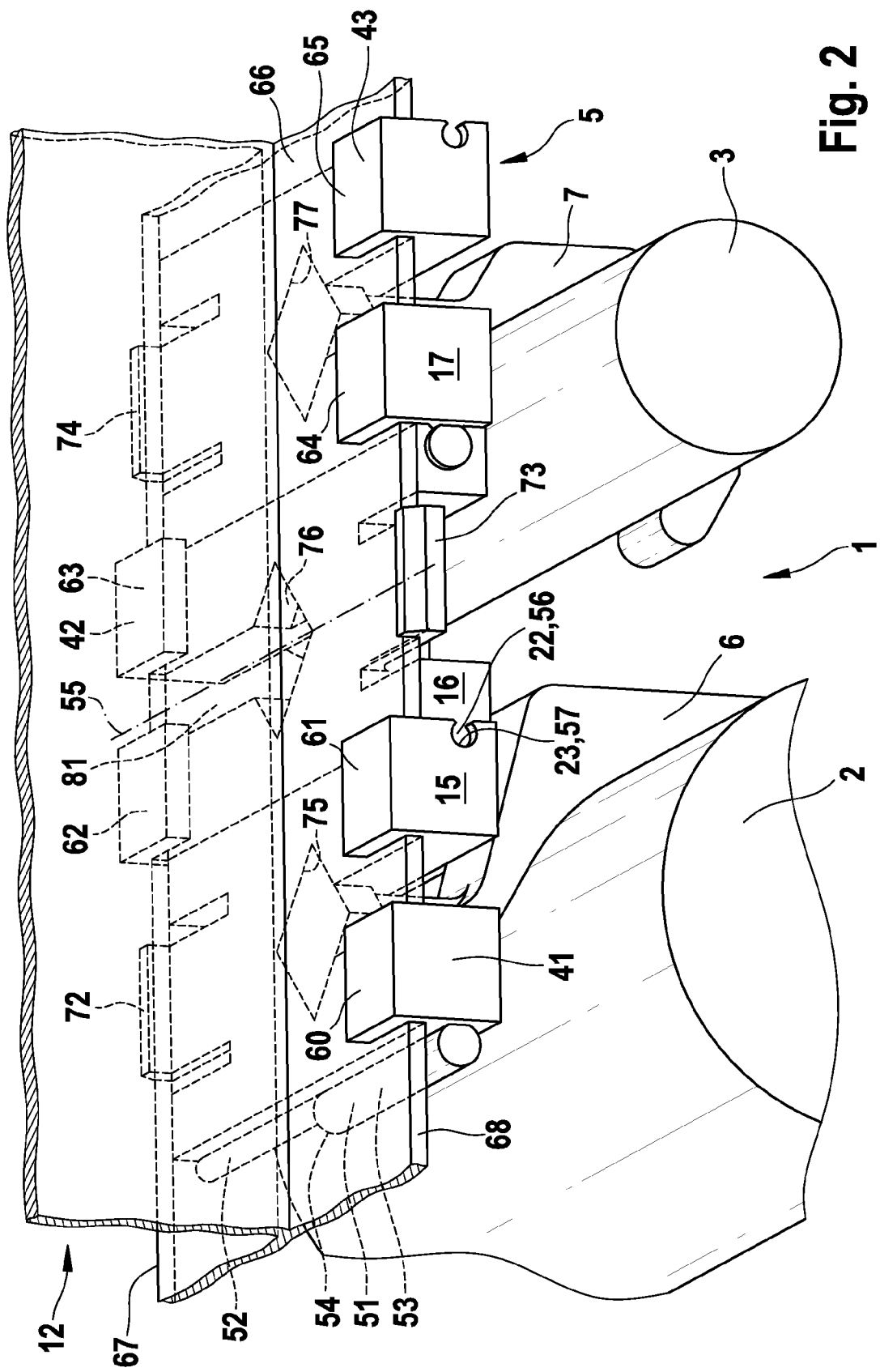
FIG. 2 shows diagrammatically, in a perspective view, a section of an aircraft or space craft according to a further embodiment of the invention.
Figure 3:
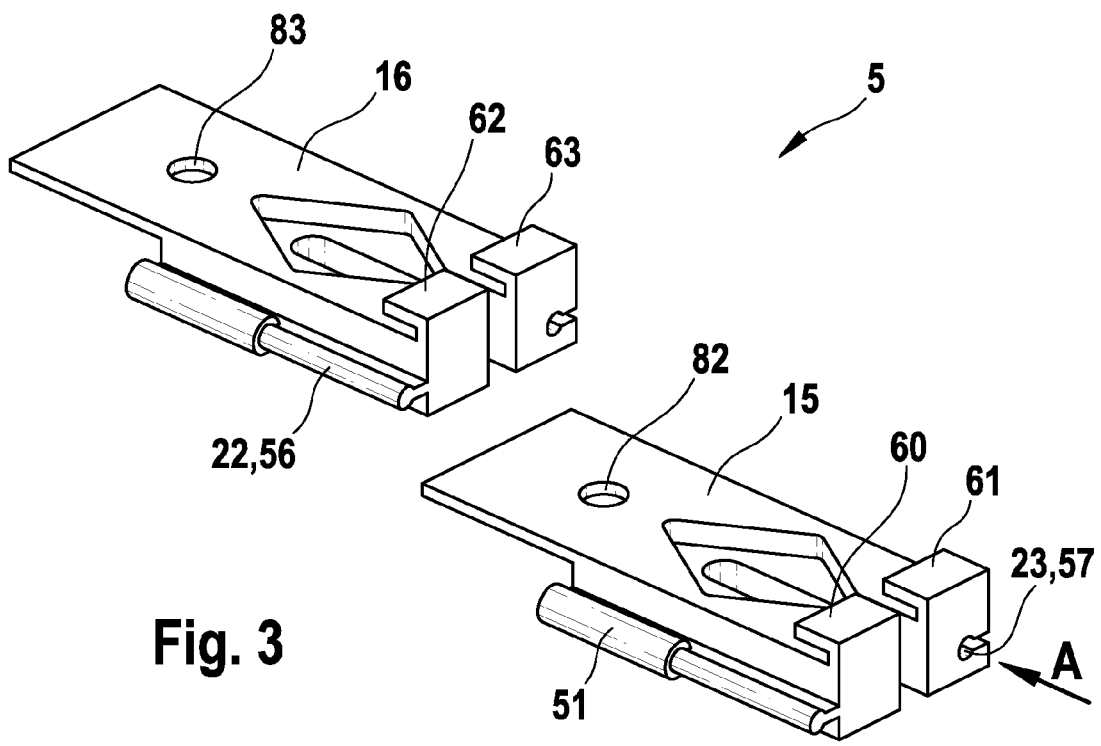
FIG. 3 shows, in a perspective view, two basic chain link brackets according to a further embodiment of the invention.
Figure 4:
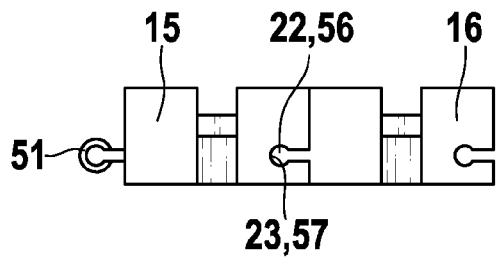
FIG. 4 shows the basic chain link brackets in FIG. 3 in a side view A when they are assembled.
Figure 5:
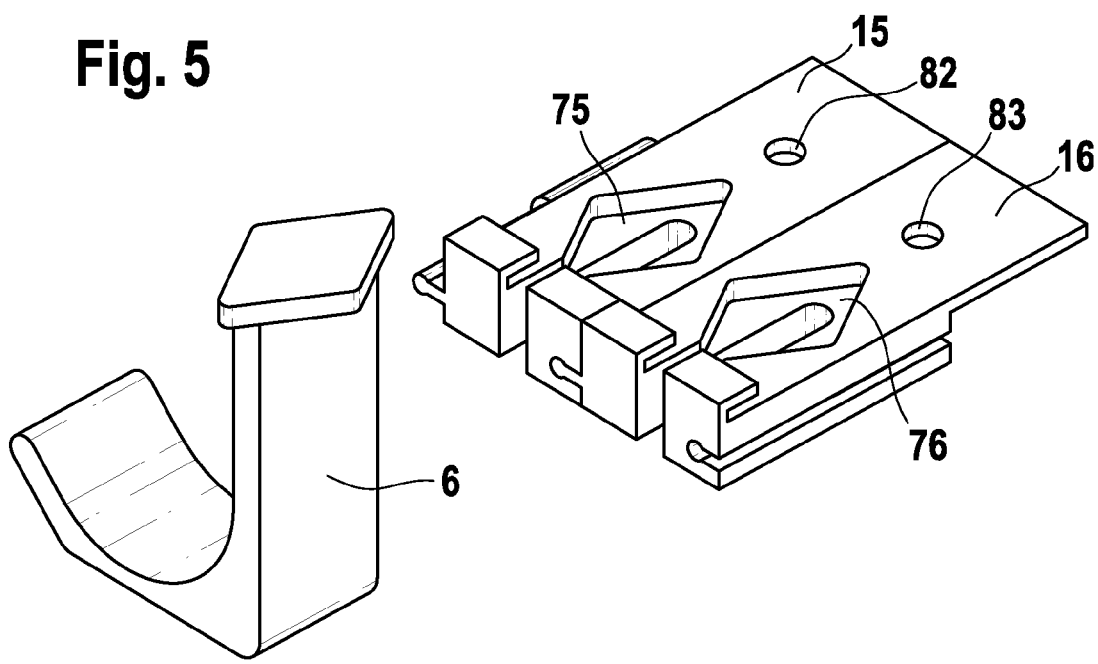
FIG. 5 shows, in a perspective view, the basic chain link brackets in FIG. 3 with a system bracket.
Figure 6:
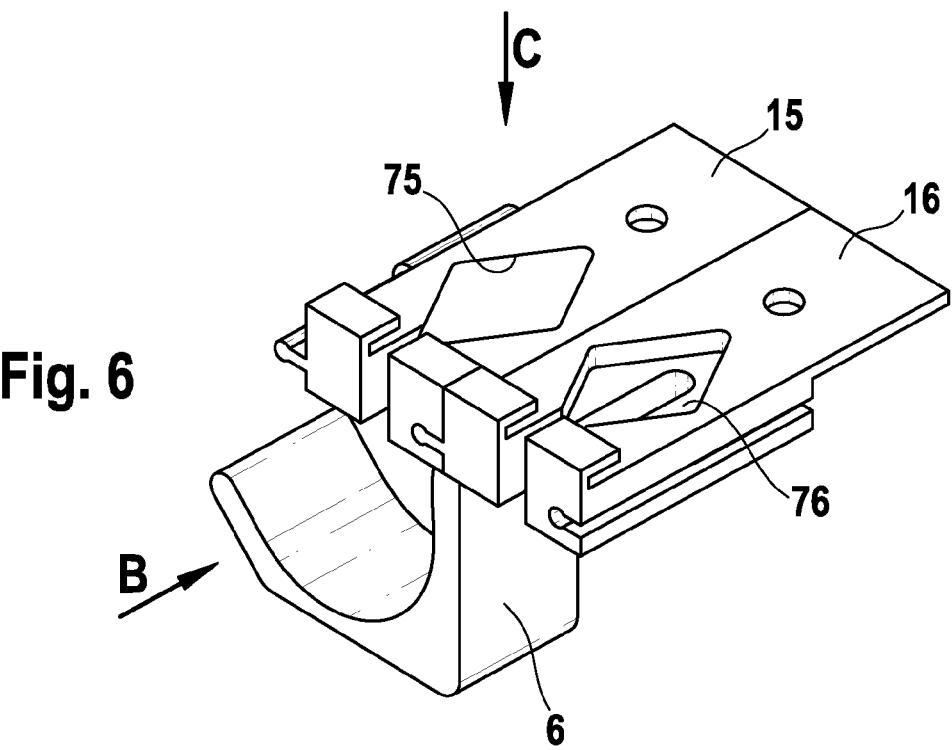
FIG. 6 shows the view shown in FIG. 5, wherein the system bracket is suspended in one of the basic chain link brackets.
Figure 7:
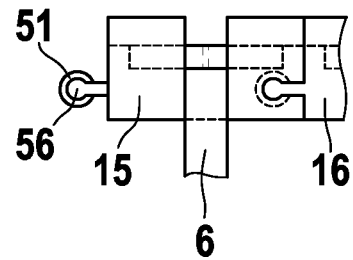
FIG. 7 shows a front view B from FIG. 6.
Figure 8:
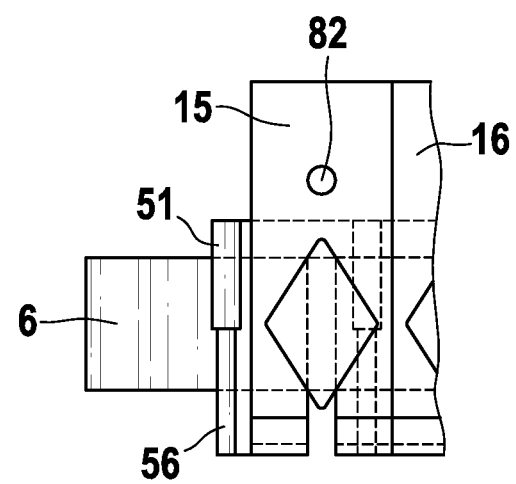
FIG. 8 shows a top view C from FIG. 6.

FIG. 2 shows, in a perspective partial view, a section of an aircraft or space craft according to a second embodiment of this invention.

For greater clarity FIG. 2 shows, in a section from FIG. 1, only the basic chain link brackets 15, 16, 17.

In the following only differences relative to the exemplary embodiment according to FIG. 1 will be discussed.

In the embodiment according to FIG. 2 the engaging element 22 is designed as a pin 51, 56 and the receiving element 23 as a bushing 57, pin 51, 56 being rotatably mounted in bushing 57. The pin (explained by the example of pin 51 for the sake of clarity) is composed of two cylindrical sections 52, 53, wherein cylindrical section 52 forms, with cylindrical section 53, a shoulder 54 which bears against a corresponding shoulder (not shown) of the bushing 57 of the basic chain link bracket 16 interlinked with basic chain link bracket 15, when these brackets are interlinked, and therefore positions the basic chain link brackets 15, 16 in a defined distance from each other in transverse direction 55 of structure 12.

According to the exemplary embodiment according to FIG. 2, supporting means 41, 42, 43 are designed as engaging behind sections 60, 61 and 62, 63 and 64, 65 respectively, offset relative to each other, said sections engaging behind a lower chord 66 of structure 12.

Engaging behind sections 60 . . . 65 are in this case designed as supporting engaging behind sections, i.e. they are able to receive the forces of gravity of systems 2, 3.

Engaging behind elements 60 . . . 65 are preferably fixed, as shown, and engaging behind lower chord 66 on opposing edges 67, 68.

Sliding of the basic chain link brackets 15, 16, 17 in transverse direction 55 of lower chord 66 is respectively prevented by snap hooks 72, 73, 74, each of which in turn engages the lower chord 66 releasably.

According to the exemplary embodiment in FIG. 2 the basic chain link brackets 15, 16, 17 each have recesses 75, 76, 77 in which system brackets 6, 7 are suspended or can be suspended (reference number 76). The recesses 75, 76, 77 are connected to a slot (denoted by way of example by reference number 81), said slot connects recesses 75, 76, 77 to an outer side of the respective basic chain link bracket 15, 16, 17 so that system bracket 6, 7 can be inserted in slot 81 by means of a movement in transverse direction 66 and can then be suspended in respective recess 75, 76, 77. This preferably takes place before assembly of basic chain link brackets 15, 16, 17 on lower chord 66. If basic chain link brackets 15, 16, 17 are fastened to lower chord 55, system brackets 6, 7 are prevented from sliding out of the preferably lozenge-shaped recesses 75, 76, 77 by lower chord 66 itself, since this prevents an upward movement of system brackets 6, 7, which would be necessary for a suspension of this.

In the exemplary embodiment according to FIG. 2 the basic chain link brackets 15, 16 are preferably designed so that they are mirror symmetrical to each other.

The exemplary embodiment according to FIGS. 3 to 8 differs from that according to FIG. 2 essentially as follows:

Instead of snap hooks 72, 73, 74, the basic chain link brackets 15, 16 have bores 82, 83 which are provided in transverse direction 55 (where mounted on lower chord 66) at certain distances from the engaging behind sections 60, 61 and 62, 63 respectively. If necessary screws or pins, which prevent the engaging behind sections 60, 61 and 62, 63 respectively from sliding out of engagement with lower chord 66, can be pushed through bores 82, 83. Furthermore, such screws or pins prevent displacement of basic chain link brackets 15, 16 in longitudinal direction 46 of lower chord 66. Additionally or alternatively provision may also be made for the screws inserted in bores 82, 83 to perform a supporting function, i.e. introducing a considerable portion of force flow 35 from system brackets 6, 7 into structure 12.

Furthermore, basic chain link brackets 15, 16 are of identical design, unlike in the embodiment according to FIG. 2.

Figure 9:
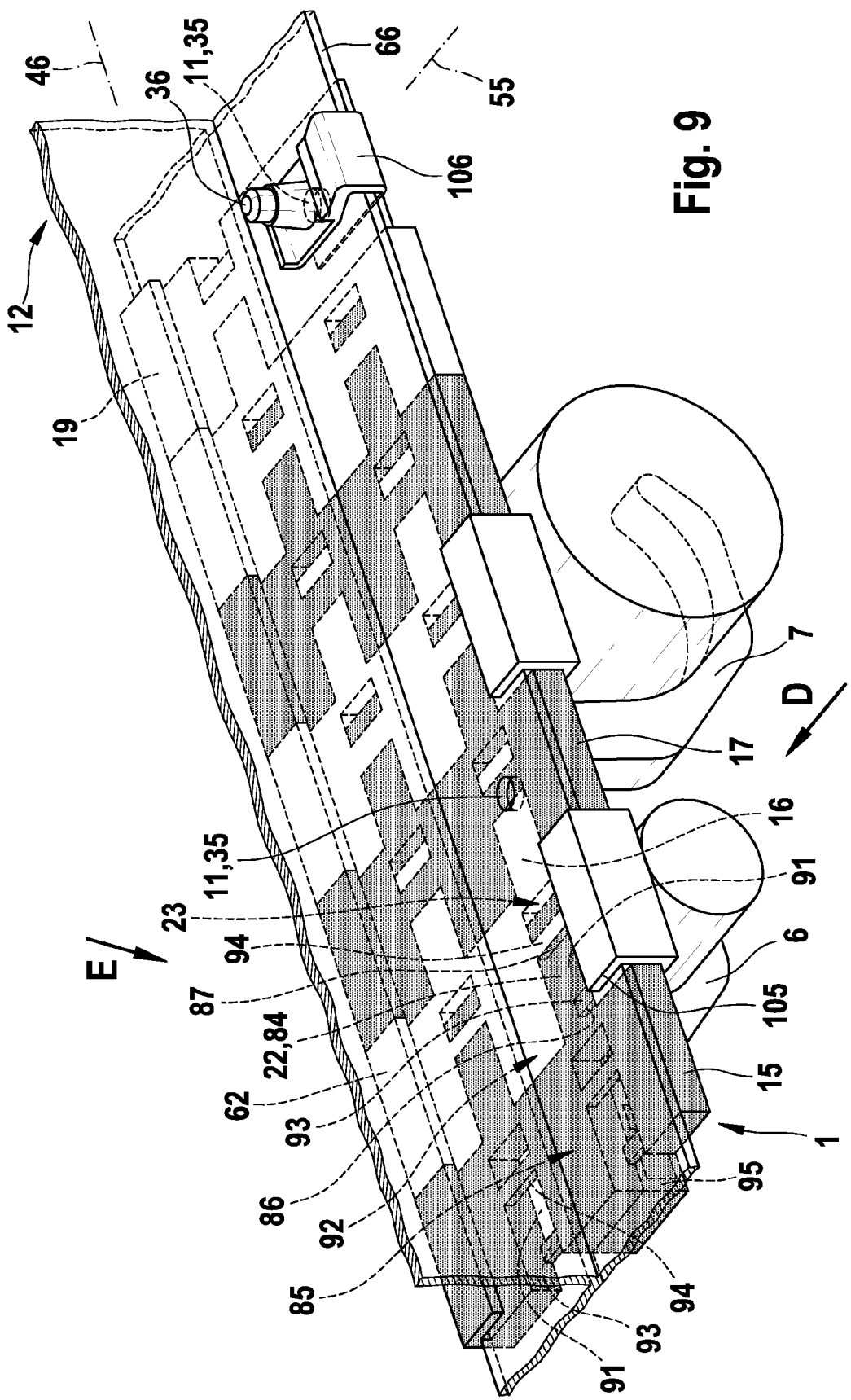
FIG. 9 shows, in a perspective view, a section of an aircraft or space craft according to a further embodiment of the present invention.
Figure 10:
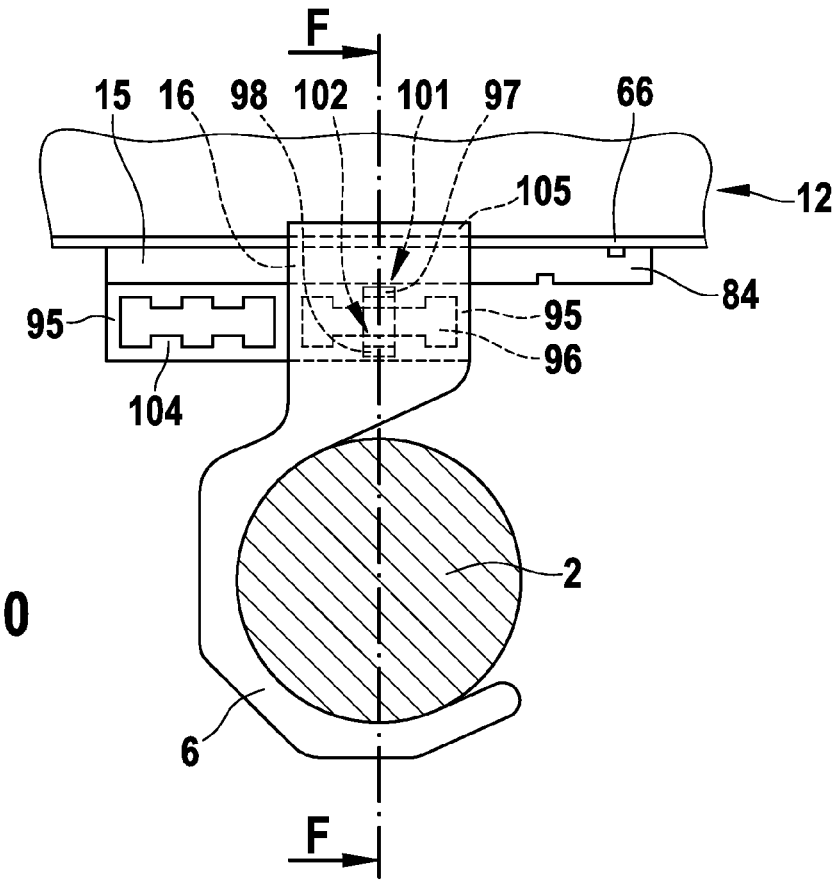
FIG. 10 shows a rear view D from FIG. 9.
Figure 10A:
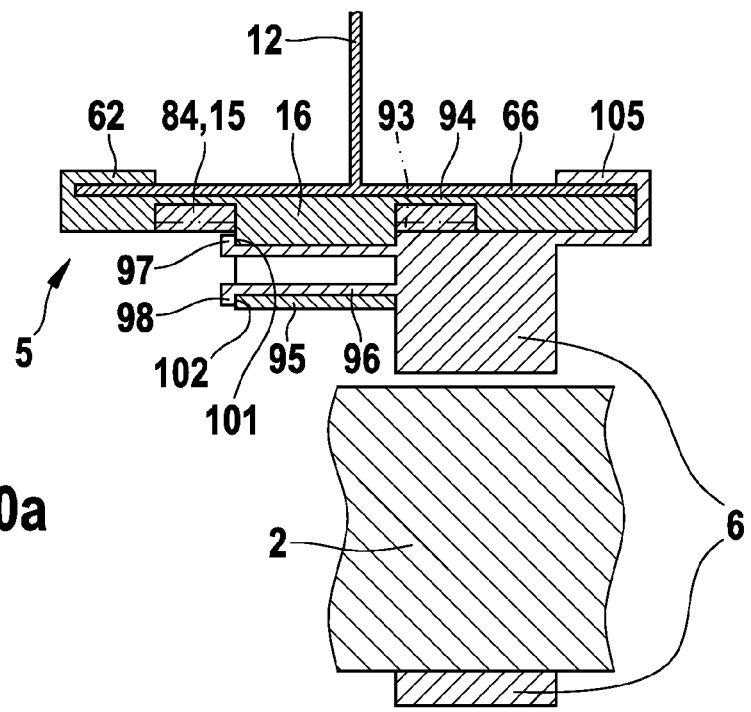
FIG. 10a shows a section F-F from FIG. 10.
Figure 11:
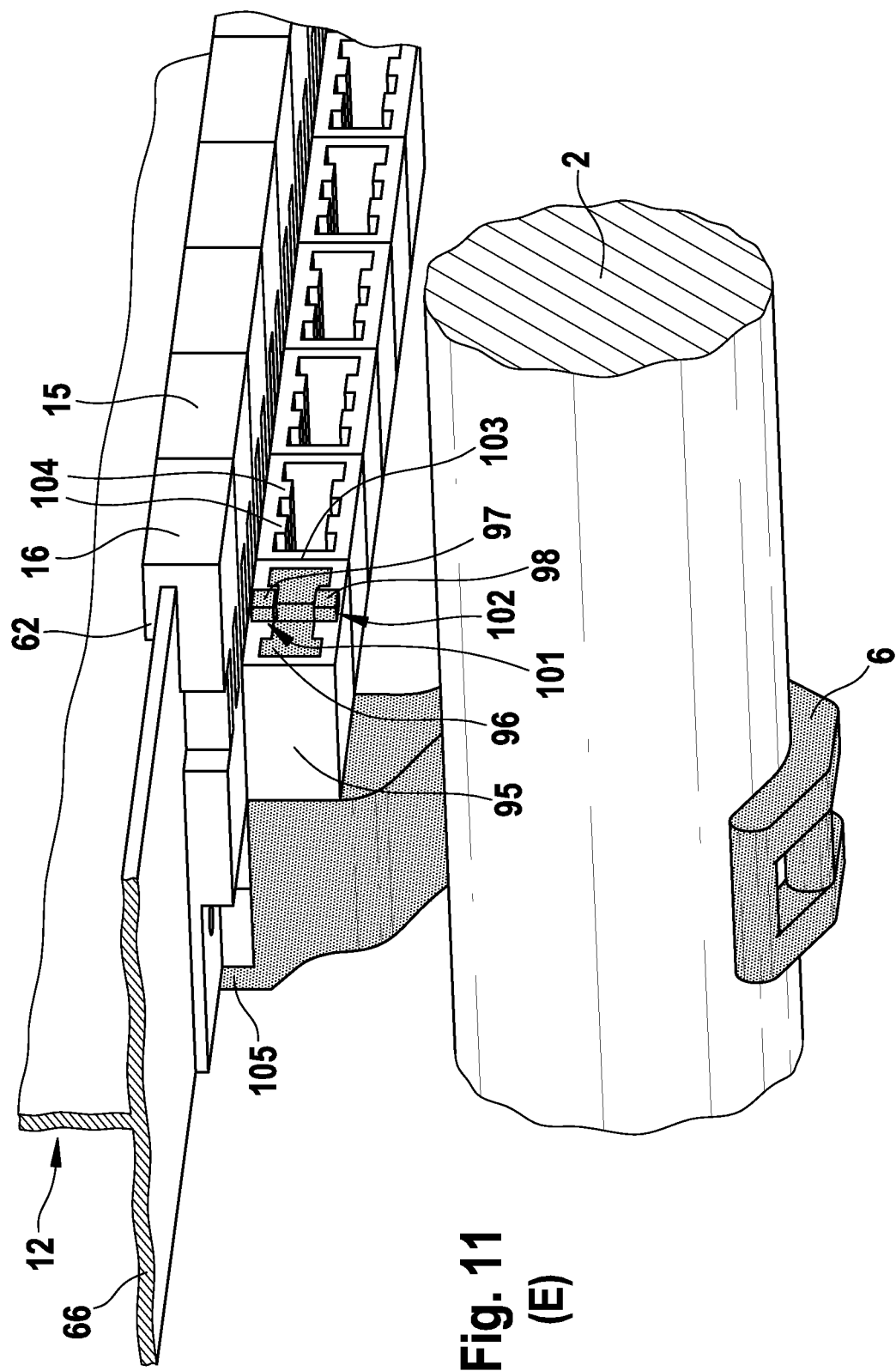
FIG. 11 shows a perspective view E from FIG. 9.

The embodiment according to FIGS. 9 to 11 differs from that according to FIGS. 3 to 8 as follows:

The engaging element 22 is designed as a finger 84 on a basic body 85 of basic chain link bracket 85 with two recesses 86, 87 offset relative to each other on the longitudinal side and arranged on opposite sides of finger 84.

The receiving element 23 is designed as two bridges 93, 94 bridging a slot 91 in a basic body 92 of basic chain link bracket 16 said bridges being offset to each other in the longitudinal direction 46 of lower chord 66.

Figure 9A:
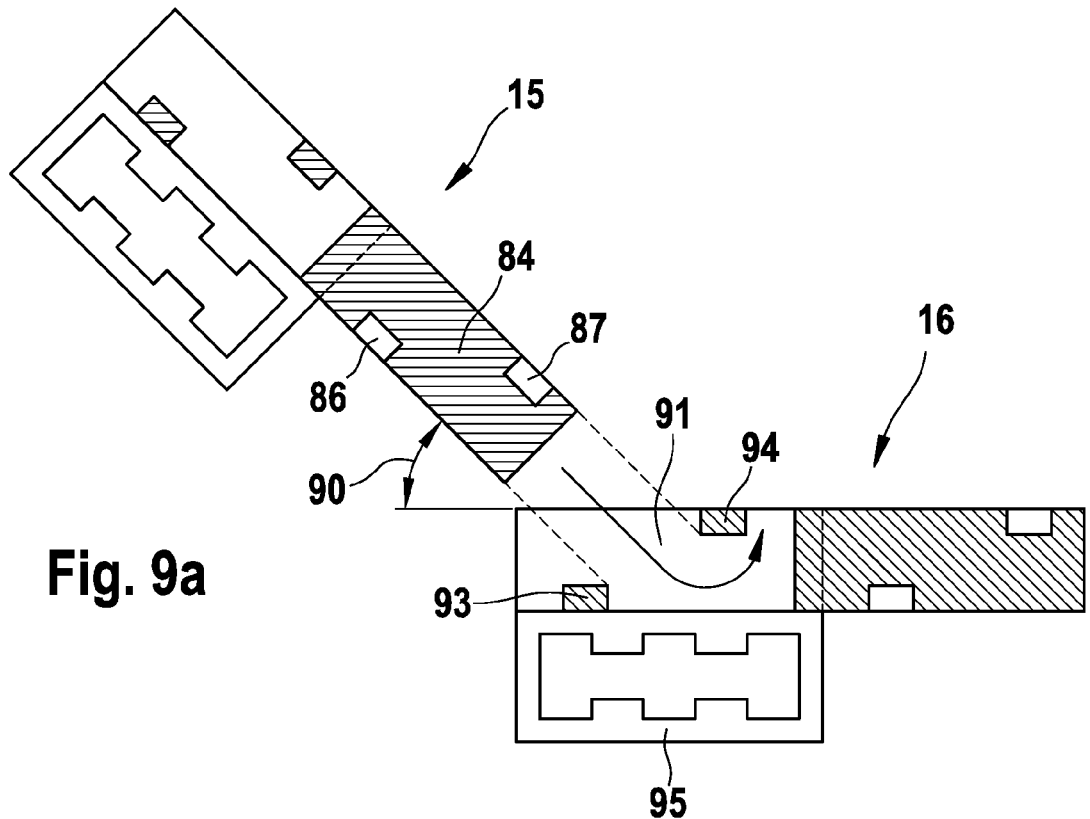
FIG. 9a shows diagrammatically two adjacent basic chain link brackets from FIG. 9 before they are connected together.
Figure 9B:
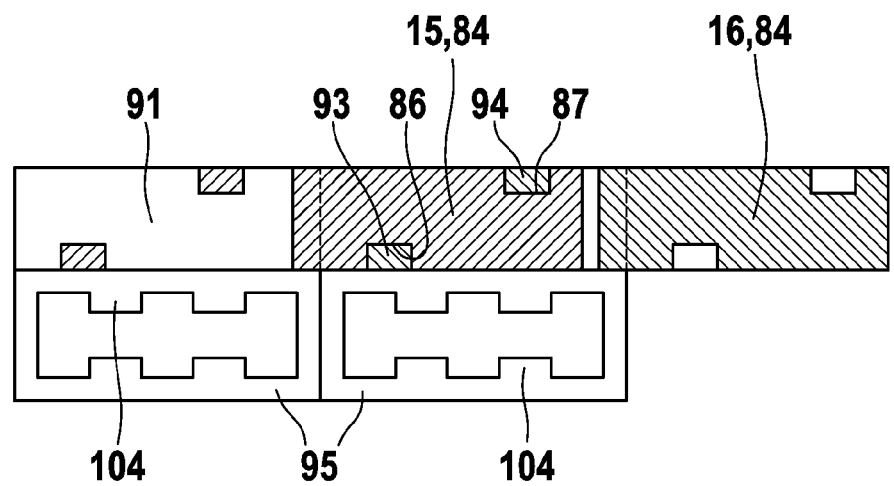
FIG. 9b shows the two adjacent basic chain link brackets from FIG. 9a after they are connected together.

When device 1 is assembled basic chain link brackets 15, 16 (explained in greater detail by way of example for basic chain link brackets 15, 16) are first arranged in relation to each other in such a manner that finger 84 forms an angle 90 to slot 91 (see FIG. 9a), finger 84 is then inserted between bridges 93 and 94, and finger 84 is then aligned along slot 91 so that recesses 86, 87 are brought into engagement with bridges 93 and 94, respectively (see FIG. 9b). Device 1 is then mounted on lower chord 66, as shown.

A further difference relative to the embodiment according to FIGS. 3 to 8 consists in how the system brackets 6, 7 are fastened to the basic body arrangement 5.

Preferably each of the basic chain link brackets (explained below in greater detail, by way of example, for basic chain link bracket 16) has a bushing 95, in which can be inserted a plug 96 formed on system bracket 6. Plug 96 preferably has engaging elements 97, 98, for example in the form of two snap hooks which, after plug 96 is inserted in bushing 95, engage behind them elastically in a releasable fashion in regions 101, 102. This is seen particularly clearly in FIG. 11, where system bracket 6 is coloured in for easier comprehension. On the left in FIG. 11 chain link bracket 17 has not been shown for greater clarity. On the right side in FIG. 11 it can be seen how further basic chain link brackets are connected to basic chain link bracket 15, which brackets are not shown in FIG. 9.

Bushing 95 preferably has an essentially rectangular cross-section 103 in which plug 96 can be received. Cross-section 103 is preferably provided with a plurality, in particular four, of longitudinal ribs (denoted by way of example by reference number 104), which ribs are brought into engagement with corresponding grooves in plug 96 when inserted in bushing 95.

Furthermore, system brackets 6, 7, according to the exemplary embodiment according to FIGS. 9 to 11, preferably have engaging sections 105 (explained below taking the example of system bracket 6) for engaging behind lower chord 66. Engaging behind section 105 here engages lower chord 66 opposite engaging section 62 of basic chain link bracket 16 in such a manner that engaging behind sections 62, 105 clamp it. Release of the clamping is prevented by engaging behind elements 97, 98, already explained, which elements are brought into engagement with regions 101, 102. In this exemplary embodiment both engaging sections 62 and 105 are assigned a supporting function Preferably, in the exemplary embodiment according to FIGS. 9 to 11 a basic chain link bracket 19 is fastened to lower chord 66 by means of the screw (or pin) 36, which extends through bore 35 and which is screwed to locking clip 106 gripping lower chord 66 on its edge.

Figure 12:
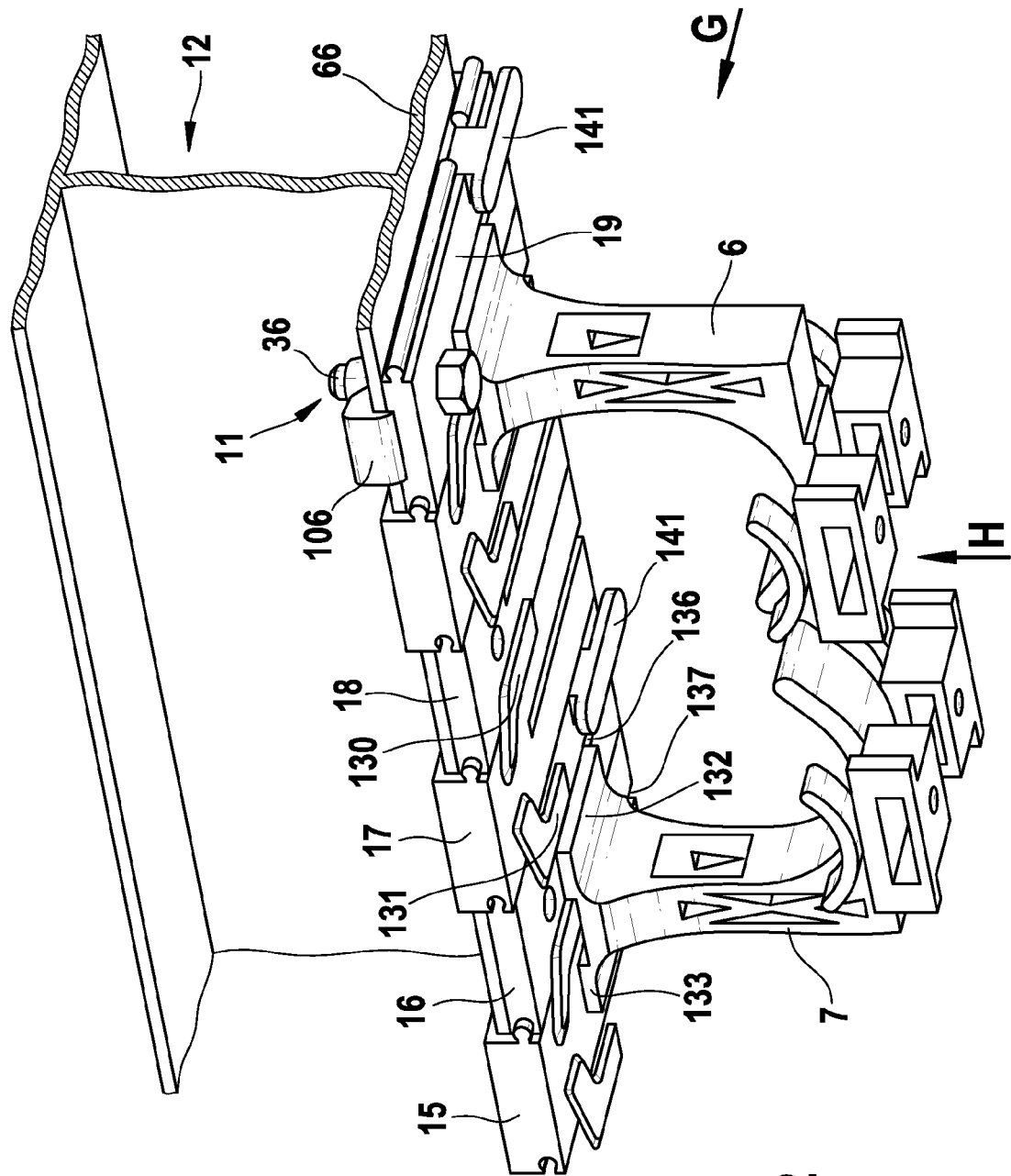
FIG. 12 shows, in a perspective view, a section of an aircraft or space craft according to a further embodiment of this invention.
Figure 13:
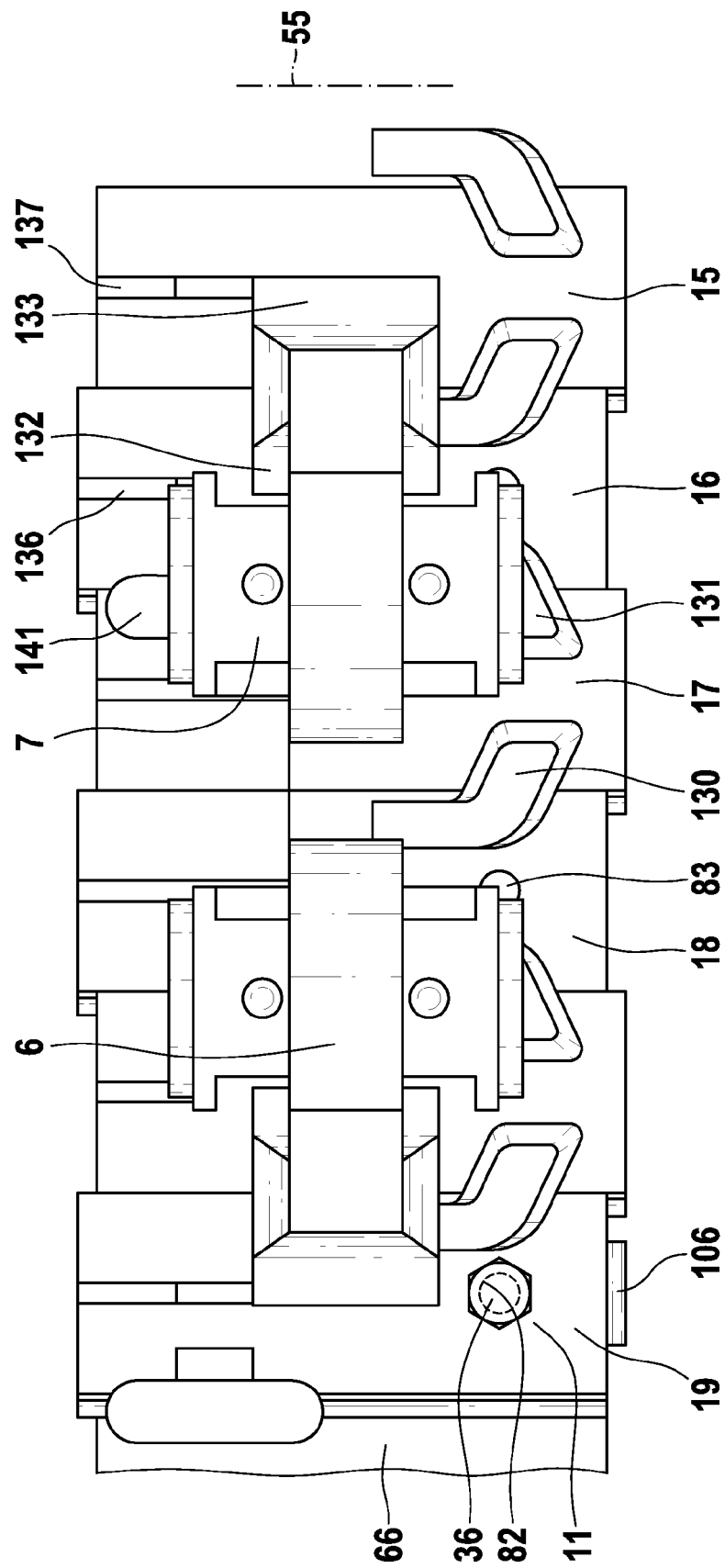
FIG. 13 shows a bottom view H from FIG. 12.
Figure 14:
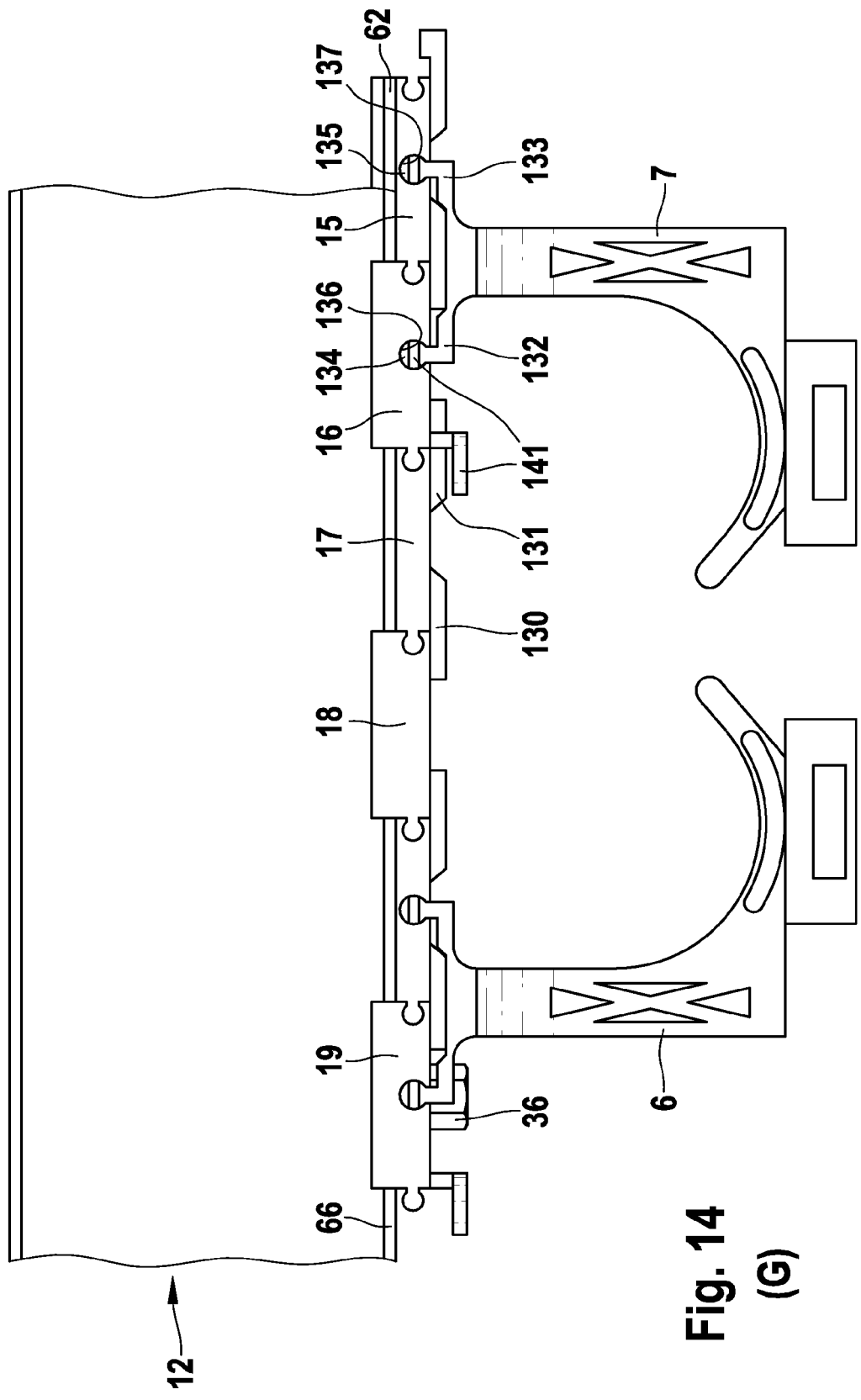
FIG. 14 shows a front view G from FIG. 12.

FIGS. 12, 13 and 14 each show a section of an aircraft or space craft according to a further exemplary embodiment of the invention. Only the differences relative to the exemplary embodiment in FIG. 2 will be discussed in the following.

The principle of operation of the exemplary embodiment according to FIGS. 12 to 14 is explained in greater detail, by way of example, with reference to basic chain link brackets 15 . . . 18.

Basic chain link bracket 17 has arms 130, 131 each of which extend in the direction of basic chain link brackets 16, 18 adjacent to basic chain link bracket 17, and support them. Thus higher forces can be transmitted between basic chain link brackets 16, 17, 18 for supporting the systems.

The exemplary embodiment according to FIGS. 12 to 14 also differs from that according to FIG. 2 in that system brackets 6, 7 are not suspended in an individual chain link bracket but in that system holders 6, 7 have two feet 132, 133 (explained taking the example of system bracket 7), which feet are provided with engaging behind elements 134, 135 at their ends, each of which elements are inserted in undercut grooves 136, 137 in two adjacent basic chain link brackets 15, 16 in transverse direction 55 of lower chord 66. A manually releasable interlocking mechanism 141 in this case prevents engaging elements 134, 135 from sliding out of undercut grooves 136, 137 after being inserted in them.

Furthermore, a plurality of basic chain link brackets 16, 18, 19 has bores 82, 83 for fastening them by screws or pins to a predetermined fastening section 11 of lower chord 66.

Figure 15:
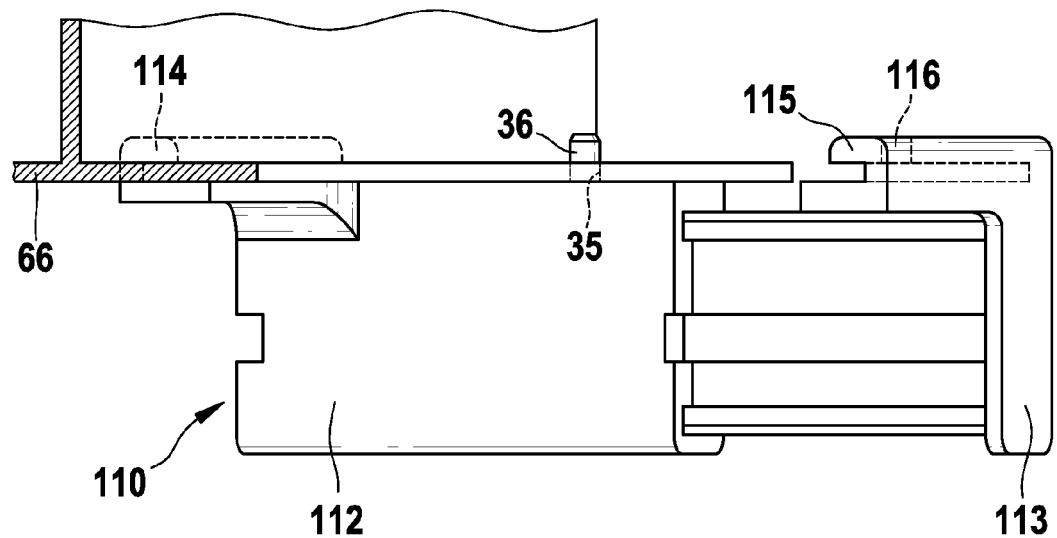
FIG. 15 shows, in a perspective view, a section of an aircraft or space craft according to a further exemplary embodiment of this invention.
Figure 16:
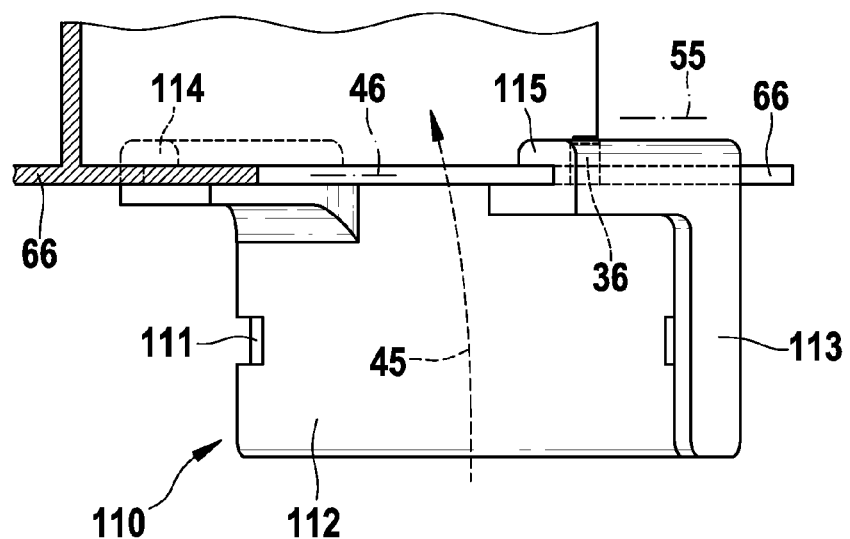
FIG. 16 shows the view from FIG. 15 with the device in the interlocked status.

FIGS. 15 and 16 each show a perspective view of a basic traverse bracket 110. However, the principle of operation, explained in the following, of one or a plurality of basic chain link brackets 13 . . . 19 of the previous embodiment can be applied.

The basic traverse bracket 110 has two parts 112, 113 that are guided linearly into each other are interlockable by means of a snap hook 111. Parts 112 and 113 are each provided with supporting engaging behind sections 114, 115 arranged opposite to each other, in which sections a positive clamp 45 resulting from the supporting of systems 2, 3, 4 can be received.

The engaging behind section 115 preferably has a slot 116 which, in the interlocked status shown in FIG. 16, is brought into engagement with a pin 36 so that displacement of basic traverse bracket in longitudinal and transverse direction 46 is prevented. Thereby pin 36 is fixedly fastened to part 112 so that it extends through a bore 35 in lower chord 66 in the status of part 112 shown in FIG. 15, the latter engaging the lower chord with its engaging section 114.

Figure 17:
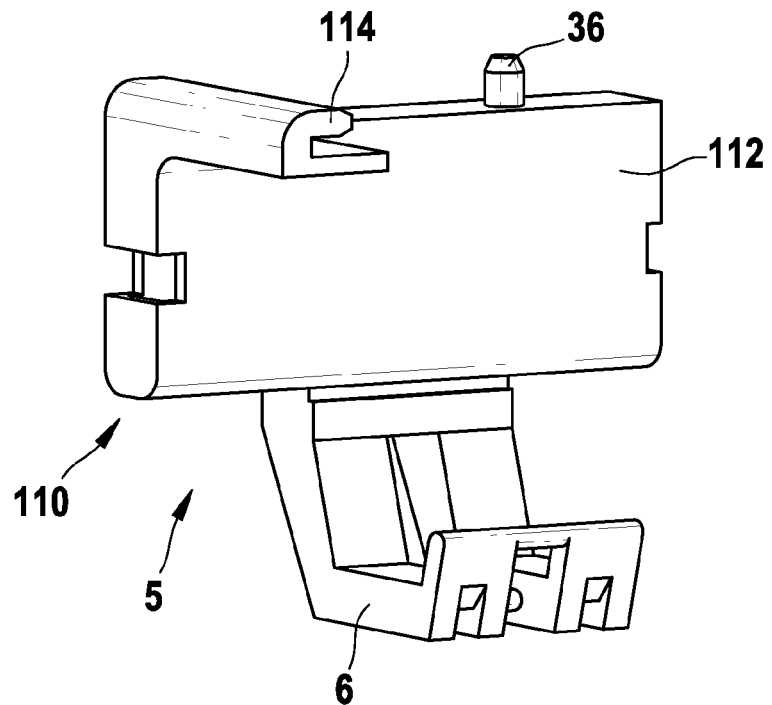
FIG. 17 shows, in a perspective view, a device according to a further exemplary embodiment of the invention.
Figure 18:
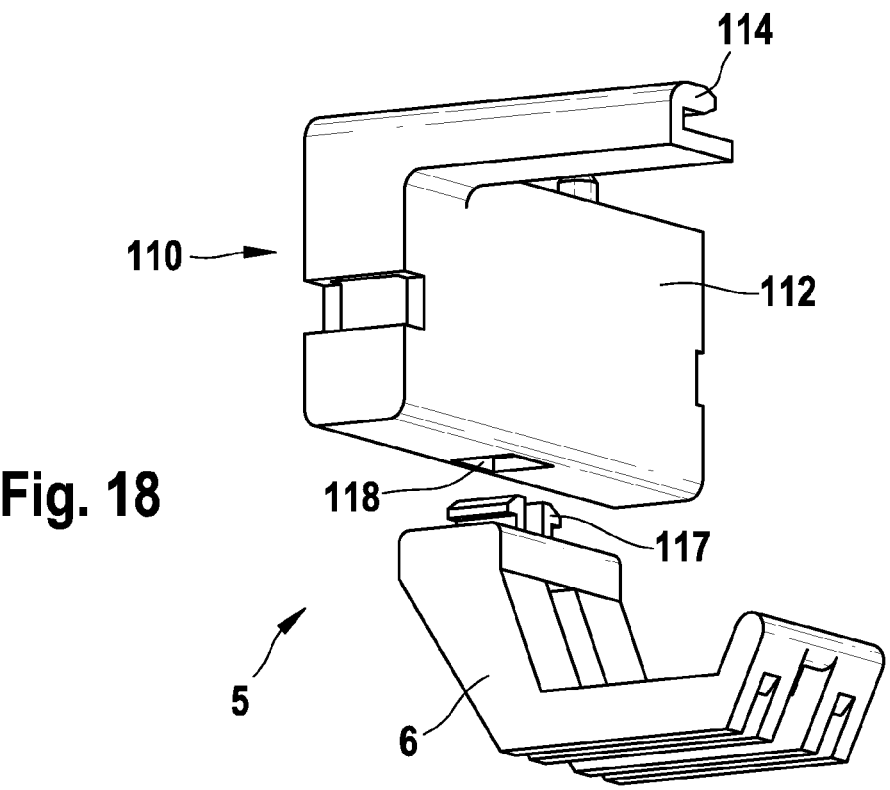
FIG. 18 shows the view from FIG. 17 with the device in the dismantled status.

The exemplary embodiment according to FIGS. 17 and 18 illustrates that system bracket 6 can also be fitted directly releasably on basic traverse bracket 110, preferably part 112, so that it is releasably fastenable. For this purpose system bracket 6 has a snap hook 117 which can be fastened in a recess 118 of part 112 in a back-hooking manner.

Figure 19:
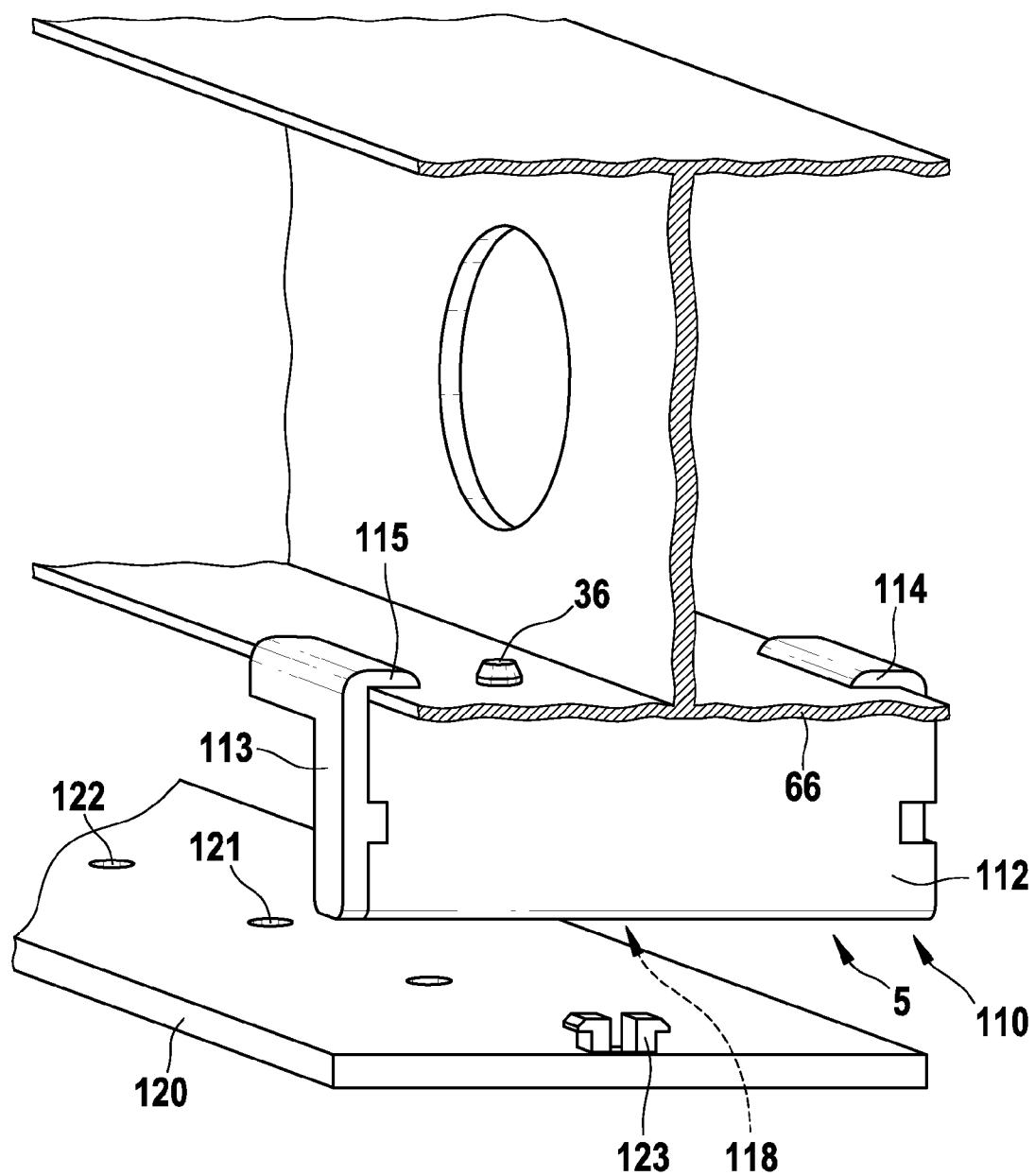
FIG. 19 shows, in a perspective view a section of an aircraft or space craft according to a further embodiment of this invention.

FIG. 19 shows basic traverse bracket 110 from FIGS. 15 and 16, wherein a traverse 120 is fastenable to it with several fastening points spaced apart adhering to predetermined segregation distances (denoted by way of example by reference numbers 121 and 122) for a releasable fastening of system brackets 2, 3, 4. At this the system brackets 6, 7 are also fastened to traverse 120 preferably by means of a snap hook 123, which can be fastened, in a back-hooking and releasably manner, as described in FIG. 18.

The basic chain link brackets 13 to 19 and/or system brackets 6, 7 and/or traverse 120 are preferably formed from an electrically and/or thermally insulating plastic material.

Figure 20:
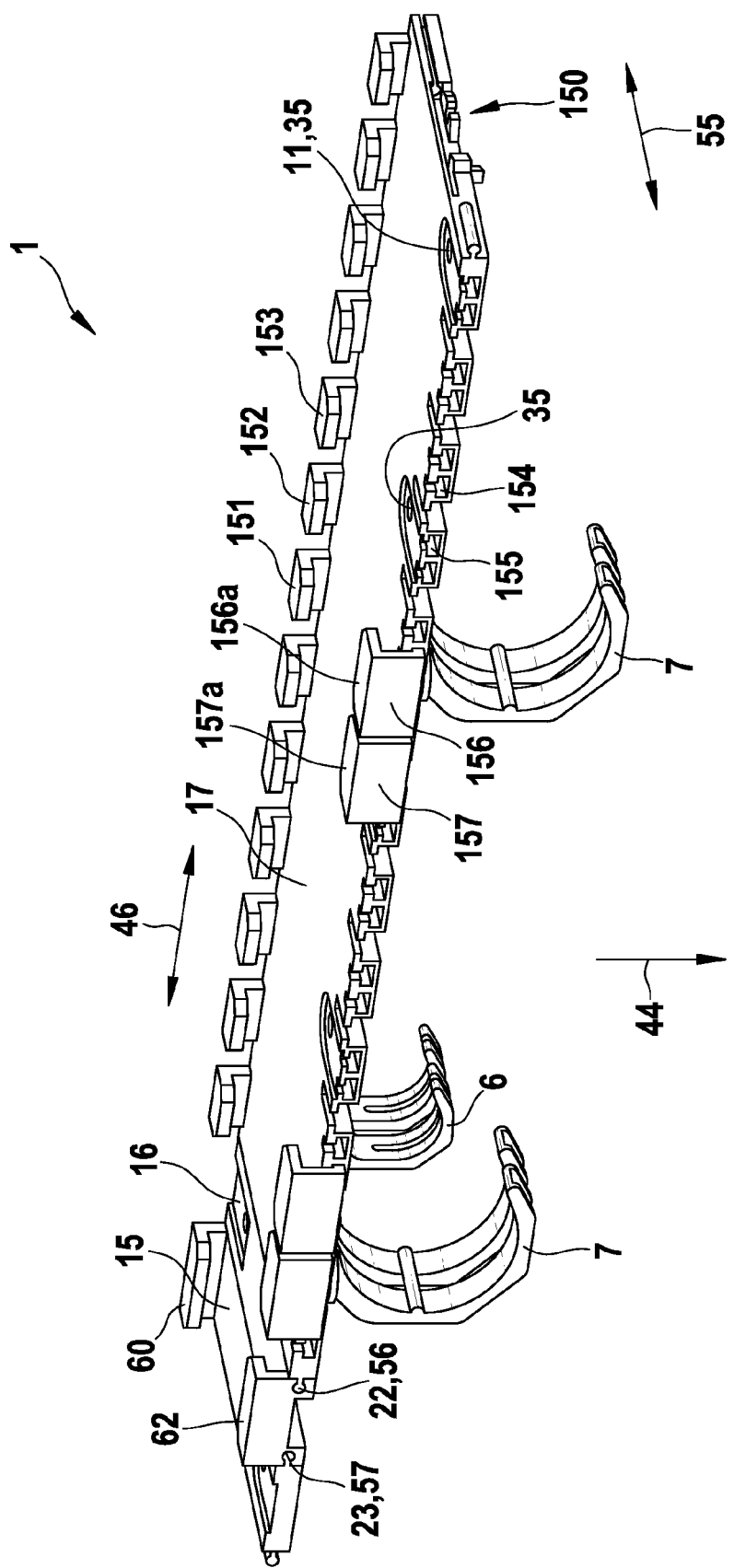
FIG. 20 shows, in a perspective oblique top view, a device according to a further embodiment of the invention.

The structure of a device according to a further exemplary embodiment of the invention is explained with reference to FIGS. 20 and 21.

According to this embodiment device 1 has three basic chain link brackets 15, 16 and 17.

The basic chain link brackets 15, 16 and 17 are connected to each other in an articulated manner, for which purpose a pin-bushing connection 22, 23 and 56, 57 respectively is provided which has already been explained in detail in connection with the exemplary embodiment according to FIG. 2. A connection of basic chain link brackets 15, 16 end 17 to each other in transverse direction 55 is in this case achieved by means of a clip connection 150 which is preferably easily releasable, which connection can be clearly seen on the right end of basic chain link bracket 15 in FIG. 21. Here basic chain link brackets 15, 16 and 17 are pushed into each other in transverse direction 55 until clip connection 150 engages. Basic chain link brackets 15 and 16 each have an engaging behind section 60 and 62, respectively, opposed to each other in an offset manner, for engaging a lower chord of a structure, not sown in greater detail, as also already described in connection with the exemplary embodiment in FIG. 2. Basic chain link bracket 17 can be fastened in longitudinal direction 46 relative to the lower chord not shown in greater detail, for example by means of one of bores 35, which interacts with a corresponding pin (not shown). Obviously basic chain link brackets 15 or 16 may in exactly the same way have the fastening to the lower chord in longitudinal direction 46.

The basic chain link bracket 17 is designed on its one longitudinal side with a plurality of engaging behind sections (provided by way of example with reference numbers 151, 152 and 153), which are also provided for engaging behind the lower chord, not shown in greater detail. Basic chain link bracket 17 preferably consists of a single piece of material, preferably a plastic injection moulding.

Figure 21:
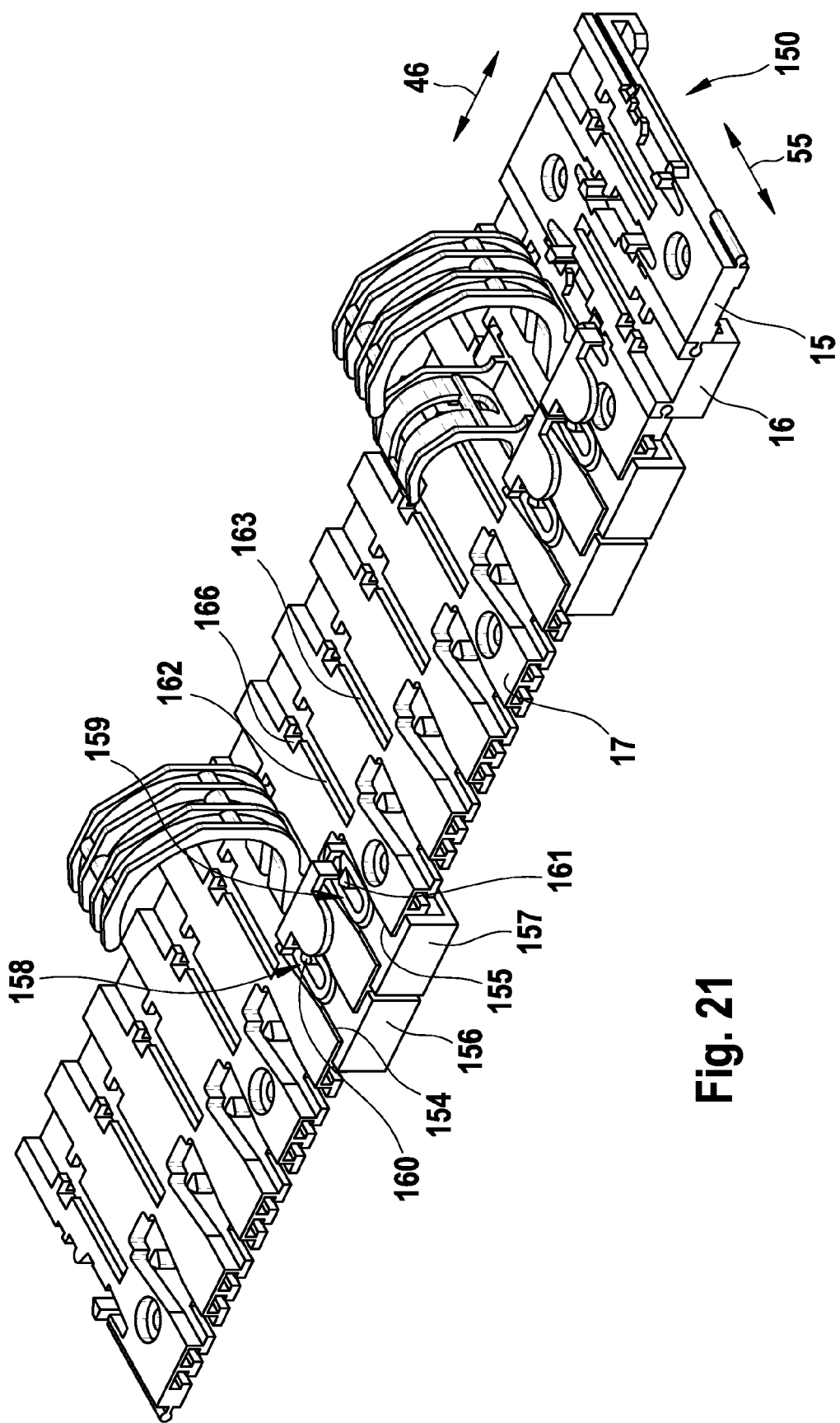
FIG. 21 shows an oblique bottom view from FIG. 20.

On its other longitudinal side basic chain link bracket 17 is designed with grooves preferably with a T-shaped cross-section (provided by way of example with reference numbers 154, 155), into which clips (provided by way of example with reference numbers 156, 157) are guided in transverse direction 55 can be inserted in a clip-in manner as shown inf FIG. 21. For this purpose clips 158, 159 each have a snap hook 158 and 159 respectively, which hook is brought into engagement, elastically in a hook-back fashion, with pins 160 and 161 respectively of basic chain link bracket 17, the pin preferably having a triangular cross-section. Furthermore, clips 156 and 157 are each provided with an engaging behind section 156a and 157a respectively for engaging behind the lower chord not shown in greater detail.

Furthermore, basic chain link bracket 17 has a plurality of grooves preferably with a T-shaped cross-section (provided by way of example with reference numbers 162, 163), which extend in transverse direction 55 of basic chain link bracket 17. These back-hooking engaging elements 164 (see FIG. 27) on brackets 6, 7 can be inserted in these grooves 162, 163. Here bracket 7 has an elastic pawl 165 in transverse direction 55 adjacent to engaging element 164, which pawl is brought into engagement elastically with a groove 166 running in the longitudinal direction when system bracket 7 is fully inserted, for example, in groove 162, and therefore prevents automatic displacement of bracket 6, 7 in transverse direction 55. Furthermore, bracket 6, 7 has, in transverse direction 55 opposite pawl 165, two pins 167 and 168 spaced at a certain distance from each other in longitudinal direction 46. Pins 167 are each brought elastically into engagement with snap hooks 172, 173 of clips 156 and 157 respectively, which are attached to the snap hooks 158 and 159 respectively, thereby providing a further securing of bracket 6, 7 in transverse direction 55 in addition to pawl 165. Such a double securing of bracket 6, 7 against a movement in transverse direction 55 is desirable under the partially high accelerations of up to 9 G in the aircraft. When snap hooks 172, 173 hook onto pins 167, 168 of bracket 6, 7, snap hooks 158, 159 remain in engagement with pins 160 and 161 respectively.

Figure 22:
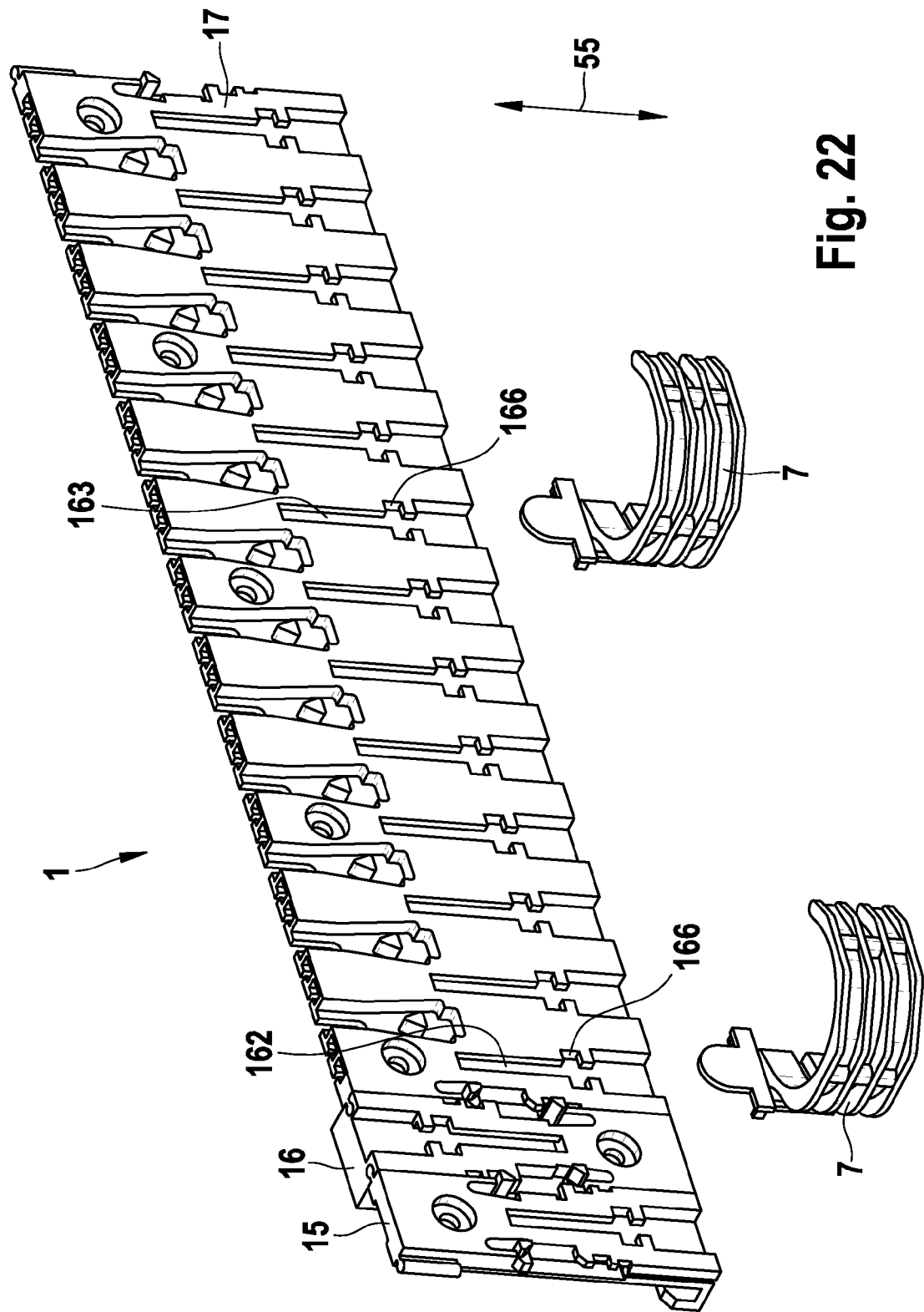
FIG. 22 shows a first assembly step for assembling the device from FIG. 20.

FIG. 22 shows a first assembly step when assembling device 1.

The brackets 7 are inserted in grooves 162, 163 in transverse direction 55, while the pawl 165 is brought into engagement with groove 166.

Figure 23:
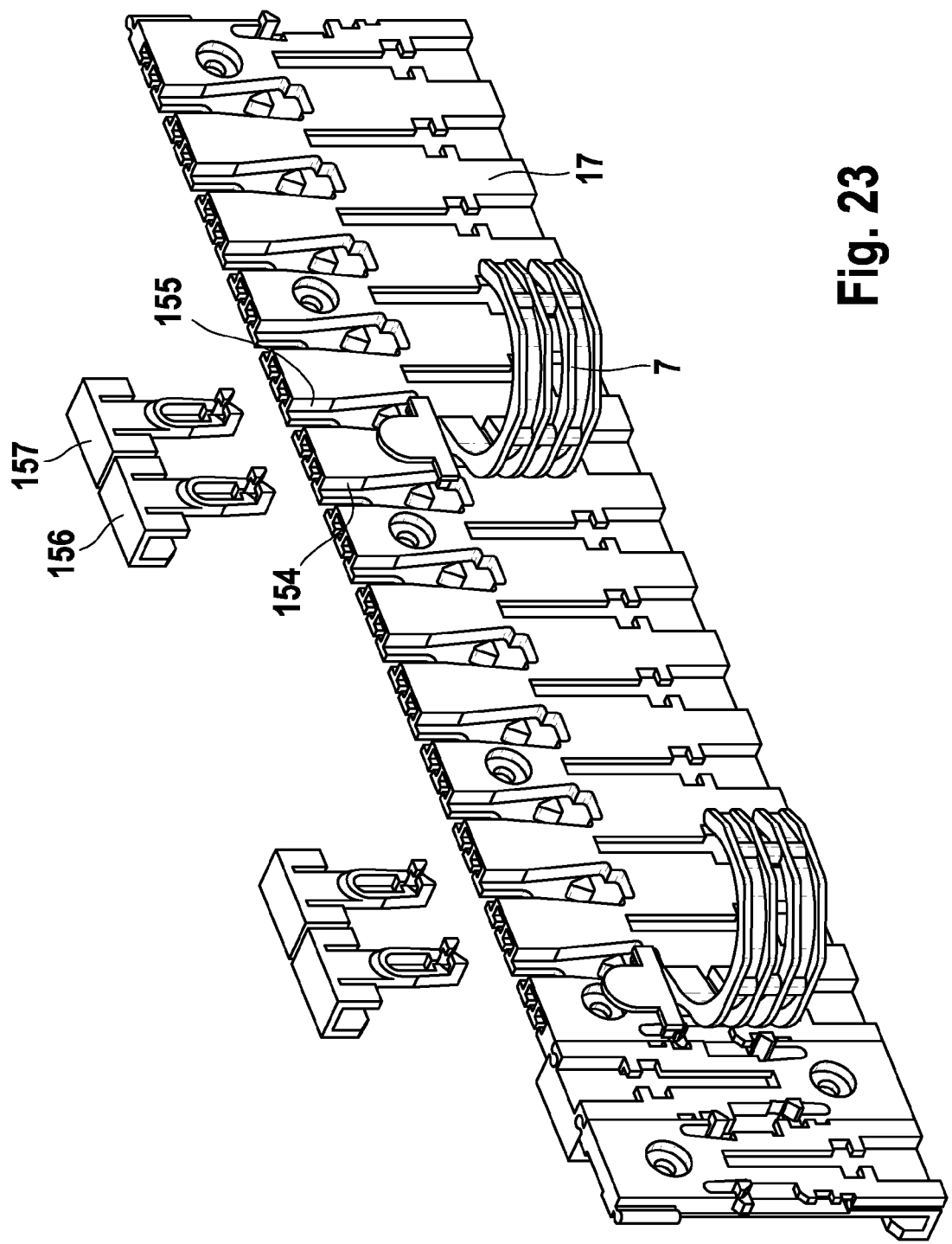
FIG. 23 shows an assembly step subsequent to the step shown in FIG. 22.

FIG. 23 shows an assembly step subsequent to the step shown in FIG. 22.

Figure 24:
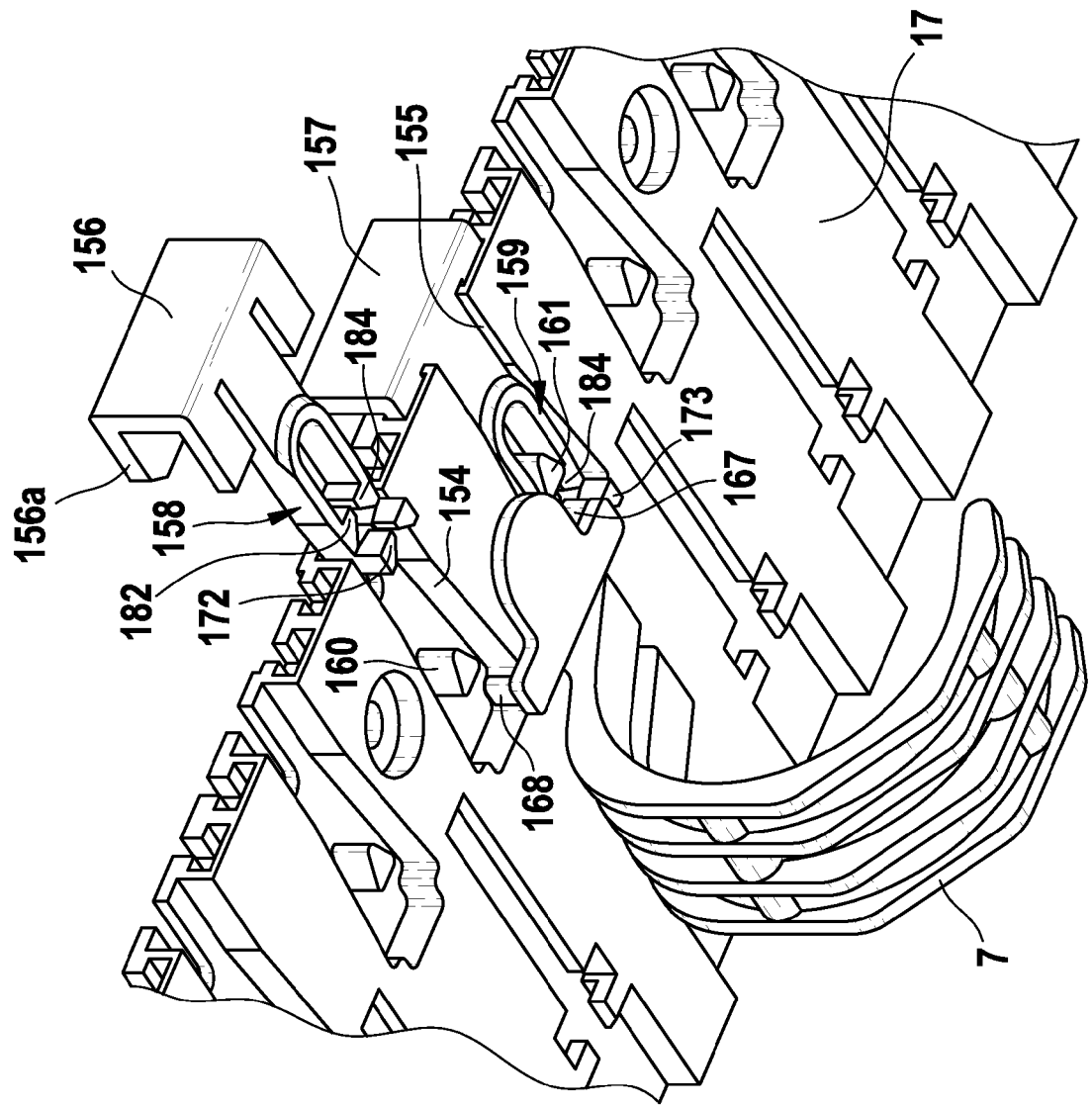
FIG. 24 shows an assembly step subsequent to the step shown in FIG. 23.

In this step two clips 156, 157 for each bracket 7 are inserted in the grooves 154, 155. This can be clearly seen in FIG. 24. Here snap hooks 158 and 159 are then brought into engagement with pins 160 and 161 respectively of basic chain link bracket 17 and snap hooks 172, 173 are brought into engagement with pins 167 and 168 respectively of bracket 7.

Figure 25:
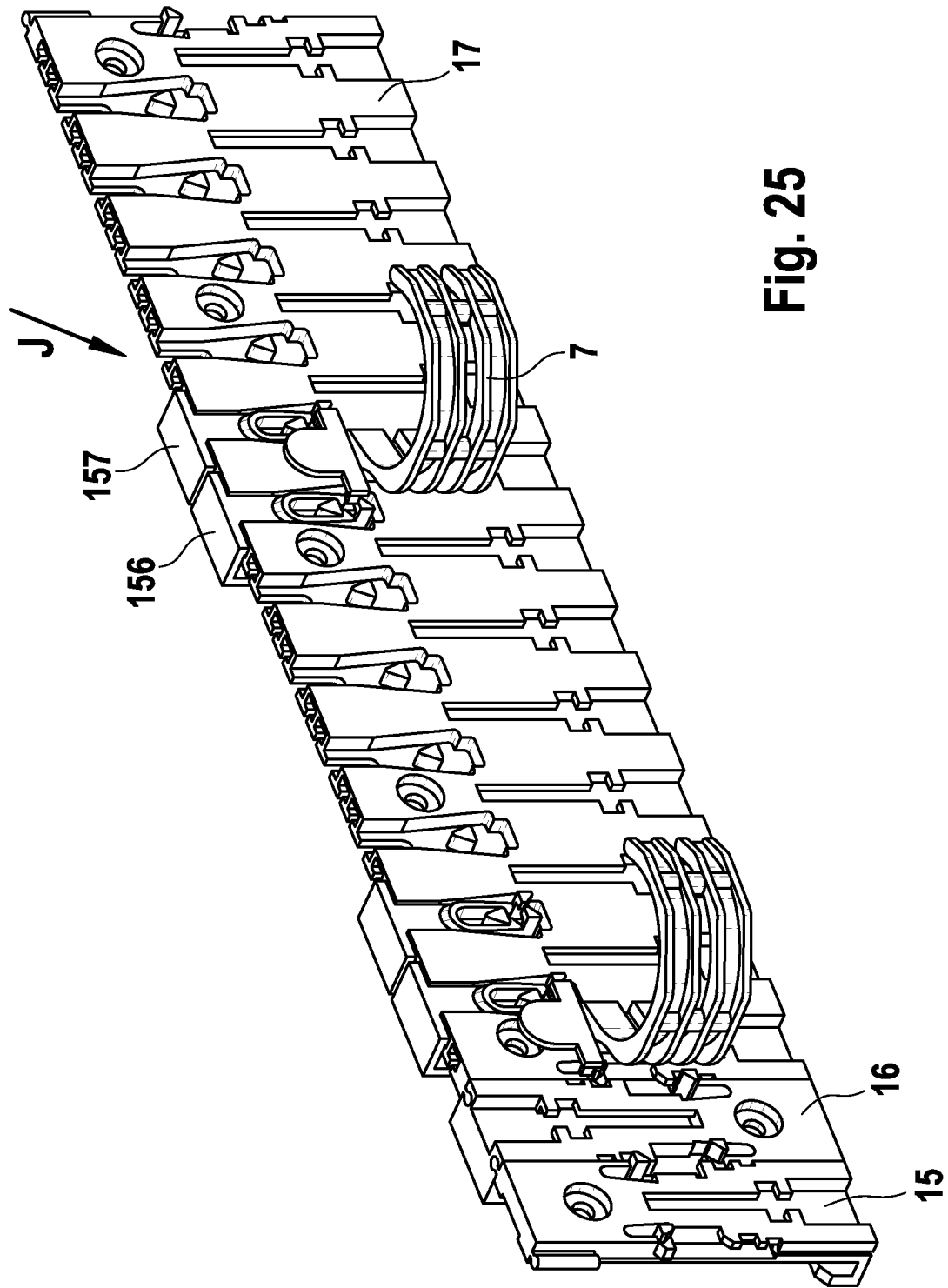
FIG. 25 shows an assembly step subsequent to the step shown in FIG. 24.

If the clips 156 and 157 are clipped in, the status shown in FIG. 25 results. The basic chain link bracket 17 is positively connected by means of the engaging behind sections 151, 152, 153 and 156a, 167a, see FIG. 20, in the direction of force of gravity 44, see FIG. 1, to the lower chord not shown in greater detail.

Figure 26:
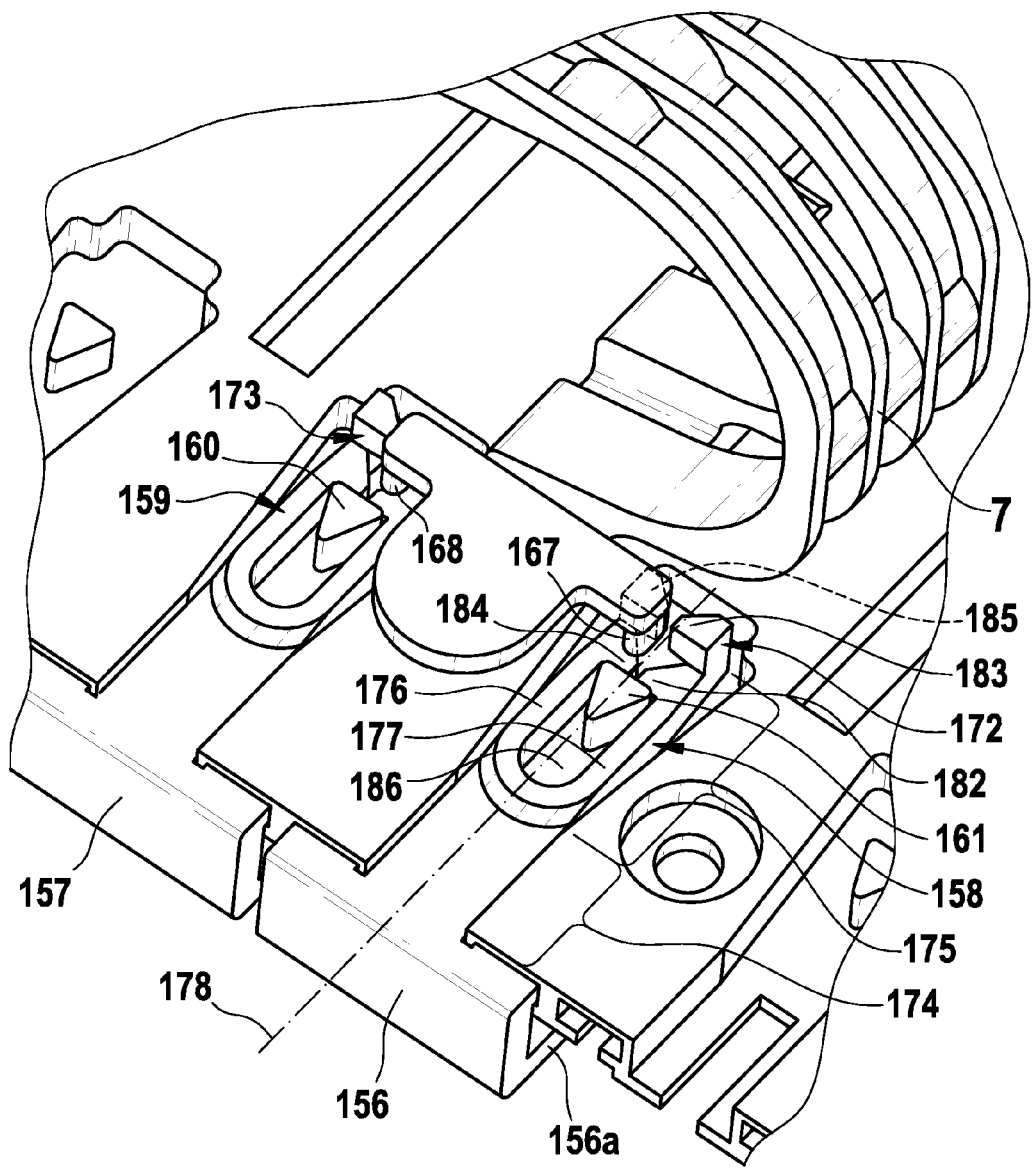
FIG. 26 shows an enlarged view J from FIG. 25.
Figure 27:
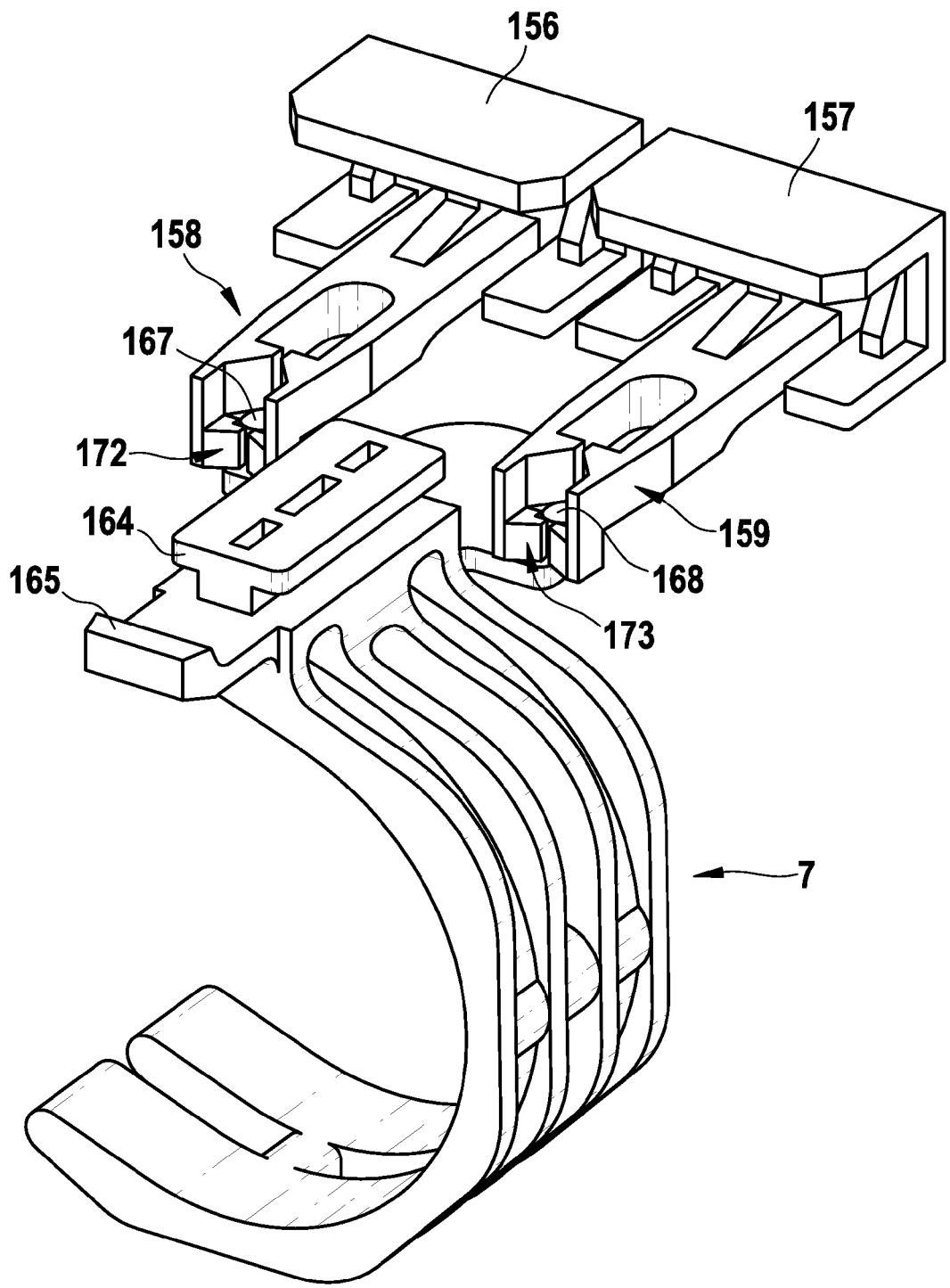
FIG. 27 shows a rear view of the arrangement in FIG. 26, wherein the basic chain link bracket is not shown, for a better understanding.

FIGS. 26 and 27 show the precise structure of snap hooks 158, 159 and 172, 173, and will be explained by way of example with reference to clip 156. Clip 156 has the engaging behind section 156a, to which a web 174 is connected. An approximately U-shaped section 175 is attached to the web 174. The two legs 176 and 177 of U-shaped section 175 each have two noses 182, 183 and 184, 185 respectively directed towards longitudinal axis 178 of the U-shaped section, wherein nose 183 or 185 is offset relative to nose 182 of 184 in a direction parallel to longitudinal axis 178. A tool (not shown), in particular a screwdriver, may be inserted in recess 186 of the U-shaped section, by means of which tool legs 176 and 177 can be spread open towards each other so that clip 156 can be released again from basic chain link bracket 17.

Although the present invention has been described in connection with specific embodiments, it is not limited to them but can be modified in a number of different ways.

In particular, the embodiments described can be combined in any manner. In particular one of the basic chain link brackets could be designed for supporting a traverse.

The present invention relates to a device for supporting systems, for example an electric cable or fluid-carrying pipe, on a structure of an aircraft or space craft, and to an aircraft or space craft with such a device. The device has a basic bracket arrangement which can be fastened to at least one predetermined fastening section of the structure, and also has at least one system bracket for supporting the systems. The advantage of the invention consists in the fact that a route of a system can be flexibly varied even during the equipment assembly, i.e. the structure is no longer modifiable or is only modifiable at considerable expense.

In principle the invention is applicable to all areas of engineering, particularly power stations or cars. For example, a cable harness can be retained on a bodywork in a car, by means of the device according to the invention.

What claimed is:

1. A device for supporting systems of at least one of a plurality of cables and a plurality of pipes on a structure of an aircraft or space craft, comprising:
   a basic bracket arrangement capable of being fastened to at least one fastening section of the structure, comprising a plurality of interlinked basic chain link brackets,
   at least one system bracket capable of being fastened to at least one fastening section of the basic bracket arrangement,
   wherein the at least one system bracket is capable of being fastened to the at least one of the plurality of interlinked basic chain link brackets,
   wherein at least one of the plurality of basic chain link brackets comprising at least one of an engaging element and a receiving element,
   wherein the engaging element is capable of being positively engaged in a receiving element of another of the plurality of basic chain link brackets,
   wherein the engaging element is in the form of a finger on a basic body of the basic chain link bracket, comprising two recesses offset relative to each other on the longitudinal side, and arranged on opposite sides of the finger,
   wherein the receiving element is in the form of two bridges bridging a slot in a basic body of the basic chain link bracket, said bridges being offset relative to each other in a direction of forming a positive clamping between the engaging element and the receiving element, and wherein the recesses of the finger are capable to be engaged with the bridges when the finger is inserted at an angle between the bridges, and aligned along the slot thereof.

2. The device according to claim 1, wherein the device is of modular design.

3. The device according to claim 1, wherein the at least one system bracket is capable of being fastened to at least two of the basic chain link brackets.

4. The device according to claim 1, wherein at least two of the plurality of basic chain link brackets are interlinked in at least by one of an articulated and elastic manner.

5. The device according to claim 1, wherein a plurality of system brackets are capable of being fastened to the basic bracket arrangement, and having distances from each other to meet stability requirements in aircrafts or spacecrafts.

6. An aircraft or space craft, comprising: a structure with a plurality of fastening sections; comprising a device for supporting at least one of a plurality of cables and a plurality of pipes, on a structure of an aircraft or space craft, comprising:

a basic bracket arrangement capable of being fastened to at least one fastening section of the structure, comprising a plurality of interlinked basic chain link brackets, at least one system bracket capable of being fastened to at least one fastening section of the basic bracket arrangement, wherein the at least one system bracket is capable of being fastened to the at least one of the plurality of interlinked basic chain link brackets, wherein at least one of the plurality of basic chain link brackets comprising at least one of an engaging element and a receiving element, wherein the engaging element is capable of being positively engaged in a receiving element of another of the plurality of basic chain link brackets, wherein the engaging element is in the form of a finger on a basic body of the basic chain link bracket, comprising two recesses offset relative to each other on the longitudinal side, and arranged on opposite sides of the finger, wherein the receiving element is in the form of two bridges bridging a slot in a basic body of the basic chain link bracket, said bridges being offset relative to each other in a direction of forming a positive clamping between the engaging element and the receiving element, and wherein the recesses of the finger are capable to be engaged with the bridges when the finger is inserted at an angle between the bridges, and aligned along the slot thereof.

7. The aircraft or space craft according to claim 6, wherein the structure is designed to form at least one of a support, a stringer, and a rib.

8. The aircraft or space craft according to claim 6, wherein the structure comprising at least one of a T-profile and a double-T-profile.

* * * * *